US009800052B2

(12) United States Patent
Li et al.

(10) Patent No.: US 9,800,052 B2
(45) Date of Patent: Oct. 24, 2017

(54) METHOD AND APPARATUS FOR POWER MANAGEMENT USING DISTRIBUTED GENERATION

(71) Applicant: University of Florida Research Foundation, Incorporated, Gainesville, FL (US)

(72) Inventors: Tao Li, Gainesville, FL (US); Chao Li, Gainesville, FL (US)

(73) Assignee: UNIVERSITY OF FLORIDA RESEARCH FOUNDATION, INC., Gainesville, FL (US)

(*) Notice: Subject to any disclaimer, the term of this patent is extended or adjusted under 35 U.S.C. 154(b) by 235 days.

(21) Appl. No.: 14/770,001

(22) PCT Filed: Feb. 24, 2014

(86) PCT No.: PCT/US2014/018115
§ 371 (c)(1),
(2) Date: Aug. 24, 2015

(87) PCT Pub. No.: WO2014/130972
PCT Pub. Date: Aug. 28, 2014

(65) Prior Publication Data
US 2016/0013652 A1    Jan. 14, 2016

Related U.S. Application Data

(60) Provisional application No. 61/768,209, filed on Feb. 22, 2013.

(51) Int. Cl.
*H02J 3/38* (2006.01)
*H02J 3/32* (2006.01)
*H02J 9/06* (2006.01)

(52) U.S. Cl.
CPC ........... *H02J 3/383* (2013.01); *H02J 3/32* (2013.01); *H02J 3/382* (2013.01); *H02J 3/386* (2013.01);
(Continued)

(58) Field of Classification Search
USPC .................. 307/18, 23–24, 31, 34
See application file for complete search history.

(56) References Cited

U.S. PATENT DOCUMENTS 8,260,468 B2    9/2012  Ippolito et al.
8,600,572 B2 *  12/2013 Sri-Jayantha .......... G06Q 10/04
                                              700/291

(Continued)

FOREIGN PATENT DOCUMENTS

JP    2007-129873 A    5/2007
JP    2012-060789 A    3/2012

OTHER PUBLICATIONS

Ghatikar, G. et al., "Demand Response Opportunities and Enabling Technologies for Data Centers: Findings from Field Studies," *Lawrence Berkeley National Laboratory*, Aug. 2012.

(Continued)

*Primary Examiner* — An Luu
(74) *Attorney, Agent, or Firm* — Saliwanchik, Lloyd & Eisenschenk

(57) ABSTRACT

Embodiments relate to a method and system for power demand shaping (PDS) so as to manage power generation and use. Specific embodiments relate to data center power demand shaping to achieve high-performance low-overhead data center operation. Specific embodiments can incorporate standard (utility power) energy sources, renewable energy sources, or a combination of standard (utility power) energy sources and renewable energy sources. Embodiments of the subject PDS techniques can incorporate trimming the data (Continued)

center load power so as to allow DG systems to follow the power demand efficiently and/or incorporate two adaptive load tuning schemes that can boost data center performance and enable near-oracle operation during power demand trimming process. To implement a cross-layer power optimization scheme, embodiments of the subject invention relate to a power management module that can reside between front-end distributed generation and back-end computing facilities to provide a coordinated tuning between the supply and load.

20 Claims, 16 Drawing Sheets

(52) U.S. Cl.
CPC .............. *H02J 3/387* (2013.01); *H02J 9/061* (2013.01); *Y02E 70/30* (2013.01)

(56) References Cited

U.S. PATENT DOCUMENTS

| | | | |
|---|---|---|---|
| 9,200,621 B2* | 12/2015 | Lazaris | G06Q 30/0605 |
| 9,300,137 B2* | 3/2016 | Cherian | H02J 3/00 |
| 2010/0191998 A1 | 7/2010 | Moore | |
| 2011/0035073 A1 | 2/2011 | Ozog | |
| 2012/0065792 A1 | 3/2012 | Yonezawa et al. | |
| 2013/0006431 A1 | 1/2013 | Marroyo Palomo et al. | |
| 2013/0046415 A1 | 2/2013 | Curtis | |
| 2014/0306525 A1* | 10/2014 | Greer | H02J 3/06 307/24 |

OTHER PUBLICATIONS

Chowdhury, S. et al., "Microgrid and active distribution networks," *The Institute of Engineering and Technology*, 2009.
Zareipour, H. et al., "Distributed generation: current status and challenges," *The 36th Annual North American Power Symposium*, 2004.
"Battery Technology for Data Centers and Network Rooms: VRLA Reliability and Safety," *APC*, White Paper #39, 2003, pp. 1-12.
"Getting Started Guide for HOMER Version 2.1," *National Renewable Energy Laboratory*, Apr. 2005, pp. 1-30.
"Host Power Management in VMware vSphere 5: Performance Study," *VMware*, Technical White Paper, 2010, pp. 1-10.
"The New AMD Opteron™ Processor Core Technology," *Advanced Micro Devices, Inc.*, 2011, pp. 1-5.
"The Role of Distributed Generation and Combined Heat and Power (CHP) Systems in Data Centers," *U.S. Environmental Protection Agency: Combined Heat and Power Partnership*, Technical Report, Aug. 2007, pp. 1-31.
"Unit Conversions, Emissions Factors, and Other Reference Data," *Technical Report of EPA*, Nov. 2004, pp. 1-16.
Ahmad, Faraz et al., "Joint Optimization of Idle and Cooling Power in Data Centers While Maintaining Response Time," *ASPLOS*, Mar. 13-17, 2010, Pittsburgh, Pennsylvania, USA, pp. 1-14.
Arlitt, Martin et al., "Towards the Design and Operation of Net-Zero Energy Data Centers," *13th IEEE Intersociety Conference on Thermal and Thermomechanical Phenomena in Electrical Systems*, 2011, pp. 1-9.
Banerjee, Prith et al., "Sustainable Data Centers: Enabled by Supply and Demand Side Management," *DAC'09*, Jul. 26-31, 2009, San Francisco, California, USA, pp. 1-5.
Boccaletti, Giulio et al., "How IT can cut carbon emissions," *McKensey Quarterly*, Oct. 2008, pp. 1-6.
Deng, Nan et al., "Adaptive Green Hosting," *ICAC'12*, Sep. 18-20, 2012, San Jose, California, USA, pp. 1-10.
Deng, Nan et al., "Concentrating Renewable Energy in Grid-Tied Datacenters," *ISSST*, 2011, pp. 1-6.

Drouilhet, S. et al., "A Battery Life Prediction Method for Hybrid Power Applications," *Technical Report, NREL*, 1997, pp. 1-16.
Gandhi, Anshul et al., "Optimal Power Allocation in Server Farms," *SIGMETRICS*, 2011, pp. 1-35.
Glanz, James. "EBay Plans Data Center That Will Run on Alternative Energy Fuel Cells," *The New York Times*, Jun. 20, 2012, pp. 1-4, accessed from http://www.nytmes.com/2012/06/21/technology/.
Goiri, Íñigo et al., "GreenHadoop: Leveraging Green Energy in Data-Processing Frameworks," *EuroSys'12*, Apr. 10-13, 2012, Bern, Switzerland, pp. 1-14.
Goiri, Íñigo et al., "GreenSlot: Scheduling Energy Consumption in Green Datacenters," *SC'11*, Nov. 12-18, 2011, Seattle, Washington, USA, pp. 1-11.
Govindan, Sriram et al., "Benefits and Limitations of Tapping into Stored Energy for Datacenters," *ISCA'11*, Jun. 4-8, 2011, San Jose, California, USA, pp. 1-11.
Govindan, Sriram et al., "Leveraging Stored Energy for Handling Power Emergencies in Aggressively Provisioned Datacenters," *ASPLOS'12*, Mar. 3-7, 2012, London, England, UK, pp. 1-12.
Kansal, Aman et al., "Virtual Machine Power Metering and Provisioning," *SoCC'10*, Jun. 10-11, 2010, Indianapolis, Indiana, USA, pp. 1-12.
Kirby, Brendan et al., "Customer-Specific Metrics for the Regulation and Load-Following Ancillary Services," *Technical Report, ORNL*, 2000, pp. 1-47.
Kontorinis, Vasileios et al., "Managing Distributed UPS Energy for Effective Power Capping in Data Centers," *ISCA*, Jun. 9-13, 2012, pp. 1-12.
Koomey, Jonathan G. "Growth in Data Center Electricity Use 2005 to 2010," *Analytics Press*, 2011, pp. 1-24.
Lama, Palden et al., "NINEPIN: Non-Invasive and Energy Efficient Performance Isolation in Virtualized Servers," *DSN*, Jun. 25-28, 2012, pp. 1-12.
Lasseter, Robert H. et al., "Microgrid: A Conceptual Solution," *PESC'04*, Aachen, Germany, Jun. 20-25, 2004, pp. 1-6.
Le, Kien et al., "Capping the Brown Energy Consumption of Internet Services at Low Cost," *IGCC*, 2010, pp. 1-12.
Li, Chao et al., "Characterizing and Analyzing Renewable Energy Driven Data Centers," *SIGMETRICS'11*, Jun. 7-11, 2011, San Jose, California, USA, pp. 1-2.
Li, Chao et al., "iSwitch: Coordinating and Optimizing Renewable Energy Powered Server Clusters," *ISCA*, Jun. 9-13, 2012, pp. 1-12.
Li, Chao et al., "SolarCore: Solar Energy Driven Multi-core Architecture Power Management," *HPCA*, 2011, pp. 1-12.
Liu, Zhenhua et al., "Greening Geographical Load Balancing," *SIGMETRICS'11*, Jun. 7-11, 2011, San Jose, California, USA, pp. 1-12.
Meisner, David et al., "Peak Power Modeling for Data Center Servers with Switched-Mode Power Supplies," *ISLPED'10*, Aug. 18-20, 2010, Austin, Texas, USA, pp. 1-6.
Pelley, Steven et al., "Power Routing: Dynamic Power Provisioning in the Data Center," *ASPLOS'10*, Mar. 13-17, 2010, Pittsburgh, Pennsylvania, USA, pp. 1-12.
Piagi, Paolo et al., "Autonomous Control of Microgrids," *IEEE Power Engineering Society General Meeting*, Jun. 2006, Montreal, Quebec, Canada, pp. 1-8.
Ranganathan, Parthasarathy et al., "Ensemble-level Power Management for Dense Blade Servers," *ISCA*, 2006, pp. 1-12.
Ren, Chuangang et al., "Carbon-Aware Energy Capacity Planning for Datacenters," *MASCOTS*, Aug. 7-9, 2012, pp. 1-10.
Sharma, Navin et al., "Blink: Managing Server Clusters on Intermittent Power," *ASPLOS'11*, Mar. 5-11, 2011, Newport Beach, California, USA, pp. 1-14.
Sverdlik, Yevgeniy. "Microsoft looking to test grid-independent data center," *Datacenter Dynamics*, Apr. 18, 2012, accessed from http://www.datacenterdynamics.com/critical-environment/microsoft-looking-to-test-grid-independent-data-center/64007.fullarticle, pp. 1-2.
Schwartz, Lisa. "Distributed Generation in Oregon: Overview, Regulatory Barriers and Recommendations," *Technical Report, Oregon Public Utility Commission*, Feb. 2005, pp. 1-61.

(56) References Cited

OTHER PUBLICATIONS

Tsafrir, Dan et al., "Instability in Parallel Job Scheduling Simulation: The Role of Workload Flurries," *IPDPS*, 2006, pp. 1-10.
Urgaonkar, Rahul et al., "Optimal Power Cost Management Using Stored Energy in Data Centers," *SIGMETRICS'11*, Jun. 7-11, 2011, San Jose, California, USA, pp. 1-12.
Zhang, Yanwei et al., "GreenWare: Greening Cloud-Scale Data Centers to Maximize the Use of Renewable Energy," *Middleware*, 2011, pp. 1-20.
International Search Report dated Jun. 5, 2014, for International Application No. PCT/US2014/018115.

\* cited by examiner

Definition:
$T_L$: Load following interval
$L$: Power demand of current load
$P$: Mean demand in the last control interval

```
1      for Each load tuning timestamp tick
2          if tick % T_L == 0          // update power budget
3              Budget ← max(P, L);
4          else   // maintain constant power demand
5              L ← load power measurement
6              if load demand changes
7                  ΔP_LF ← (Budget − L)
8                  Adjust load performance based on ΔP_LF
9              end if
10         end if
11     end for
```

FIG. 10

PDS-s

PDS-r

METHOD AND APPARATUS FOR POWER MANAGEMENT USING DISTRIBUTED GENERATION

CROSS-REFERENCE TO RELATED APPLICATION

The present application is a National Stage Application of International Application Number PCT/US2014/018115, filed Feb. 24, 2014, which claims the benefit of U.S. Provisional Application Ser. No. 61/768,209, filed Feb. 22, 2013, both of which are hereby incorporated by reference herein in their entirety, including any figures, tables, or drawings.

This invention was made with government support under CSR-1117261 awarded by National Science Foundation. The government has certain rights in this matter.

BACKGROUND OF INVENTION

Computer system design inevitably enters the landscape of design for sustainability as the data center power footprint has become a global concern. In the past ten years, Google server's electricity demand has increased almost 20-fold [1]. The huge IT energy consumption not only increases the total cost of ownership (TCO) but also leaves profound impact on the environment. According to a McKinsey Quarterly report, the annual $CO_2$ emissions of computing systems will research 1.54 metric gigatons within eight years, which could make IT companies among the biggest greenhouse gas emitters by 2020 [2]. Consequently, renewable energy powered data centers are gaining growing popularity in both the IT industry and academia, as a way to tackle the dual challenges of reducing energy consumption and environmental issues [3-9].

Existing proposals on renewable energy-aware power management schemes largely emphasize adapting the computer load to the time-varying power budget [3-9]. We broadly categorize these techniques into two types: 1) load tuning based design; and 2) job scheduling based design. While the former approach leverages performance scaling techniques (e.g., DVFS and server power state tuning) to track the time-varying renewable power budget [3-5], the later approach schedules job requests based on the renewable energy availability [6-9]. Since these techniques are driven by variable and intermittent power supply, they typically suffer extended job turnaround time. They can hardly maintain desired instantaneous throughput and service availability without substantial utility grid support.

The IT industry is actively looking for opportunities in non-conventional power provisioning solutions such as distributed generation.

Distributed generation (DG) refers to a variety of small, modular electric generators near the point of use. In recent years, DG has gained tremendous interest as an alternative source of power for IT industry. According to the U.S. Environmental Protection Agency (EPA), using DG in data center design could achieve great energy savings, significant environmental benefits, and high power reliability [11].

As shown in FIG. 1, DG system encompasses a wide range of green energy technologies, such as photovoltaic module (PV), wind power, fuel cell, and bio-fuel based gas turbine. While PV/wind power depends on environmental condition, the outputs of fuel cells and gas turbines are tunable. They can provide a key supporting service called load following [12], which refers to the use of online generation equipment to track the changes in customer loads. Therefore, one can take advantage of the load following capabilities of these tunable DG systems to meet the time-varying IT power demand. Such design is non-trivial because it enables data center to run on renewable energy sources without compromising workload performance.

When employing distributed generation to build a better data center power provisioning architecture, challenges arise due to the unpredictable and fluctuating data center load. FIG. 2 shows typical load following scenario that tracks customer load every 30 minutes. As can be seen, DG systems cannot provide fine-grained load demand following due to their limited response speed.

To handle the moment-to-moment load power demand, DG systems typically rely on large energy storage elements [12]. Such design not only increases the TCO (due to storage cost), but also incurs up to 25% roundtrip energy loss. More importantly, without careful power management, the disturbing load can cause frequent and excessive battery discharging actives, which may degrade the lifetime of these expensive electrical elements and quickly deplete the stored energy that is crucial for handling emergencies.

Distributed generation (DG) [10, 11] is an emerging trend of generating power locally to provide reliable, secure, and sustainable electrical energy to its consumers. Distributed generation encompasses several promising clean energy technologies such as gas turbine, biomass power, and fuel cell. These non-conventional power generators are known as microsources or distributed energy resources (DERs), and are typically Modular units of small capacity (typically between several kilowatts to tens of megawatts) [16].

In order to harness clean energy from DERs, microgrid is proposed as a local electricity distribution network that focuses on flexible and intelligent management of DG systems. The responsibility of microgrid is to dynamically control the power flow in response to any disturbance and load changes. Although microgrid can import/export power from/to the utility power line, it is usually the last resort due to the low transmission efficiency, high peak power cost, and sustainability consideration [12].

In contrast with a conventional bulk grid, which has large amount of capacity inertia, distributed generation typically does not have reserved capacity [11]. The supply and storage of energy is generally planned carefully in microgrid to ensure instantaneous demand and long-term energy balance [10].

In Table 1 we show the response speed of typical DG systems. Most energy storage devices have very fast response speed that could release power almost immediately (in ms level). As a result, they are widely used to handle moment-to-moment load oscillation and disturbances, which is referred to as regulation [12]. In contrast, gas turbines and fuel cells are typically too slow to meet the load power variation since the change of the engine speed or the chemical reaction in the fuel requires time. Therefore, they are generally used to track the intra- and inter-hour changes in customer loads, which is referred to as load following [12].

Although there is no strict rule to define the temporal boundary between regulation and load following, typically load following occurs every 10~15 minutes or more. It is not usually economically feasible to frequently adjust the output of distributed generators due to the increased performance cost and decreased fuel utilization efficiency.

The energy balance issue arises due to the fluctuating load in data centers and other computerized environments. Dynamic power tuning techniques (e.g., DVFS), frequent on/off power cycles, stochastic user requests, and data migration activities can cause varying degree of load power variation. Since distributed generators are generally placed near or at the point of energy consumption, they are often exposed to the full fluctuation of local IT loads rather than experiencing the averaging effect seen by larger, centralized power system. As a result, energy balancing becomes rather difficult in distributed generation powered data centers.

TABLE 1

Response speed of DG systems

| DG Systems | Response | Startup |
| --- | --- | --- |
| Lead-acid battery | Immediate | N/A |
| Flywheel | Immediate | N/A |
| Fuel cell | 30 sec~5 min | 20~50 min |
| Gas turbine | 10 s of seconds | 2~10 min |

Accordingly, there exists a need in the art for optimization to improve efficiency and workload performance in DG systems.

BRIEF SUMMARY

Embodiments of the subject invention relate to a method and apparatus for providing a power demand shaping (PDS) technique by utilizing load following with distributed generation (DG) systems, to meet time-varying power demand. Load following refers to using online power generation equipment to track changes in customer loads.

Embodiments of the subject invention can intelligently trim power load of DG powered computing infrastructures and enable DG systems to follow power demand efficiently. Embodiments of the subject invention feature two adaptive load tuning schemes that can boost power load performance and enable a high percentage performance of an ideal oracle design operation during power demand trimming process. Embodiments of the subject invention can be implemented as a cross-layer power management module residing between a front-end distributed generation and back-end computing facilities to provide a coordinated tuning between supply and load. Embodiments of the subject invention can avoid high performance penalty issue incurred during supply tracking.

Embodiments of the subject invention can be applied to applications including, but not limited to, DG powered data center, DG powered cloud computing infrastructure and green and sustainable facilities.

Embodiments of the subject invention pertain to distributed generation powered data centers that leverage the load following capability of onsite renewable generation, and optional interconnection with a standard power grid, to achieve low carbon footprint while maintaining sufficient performance. Specific embodiments incorporate a power demand shaping technique (PDS) to improve the load following efficiency in data centers while boosting the workload performance. Further specific embodiments utilize power demand shaping techniques incorporate one or both of two adaptive load tuning schemes: DGR Boost and UPS Boost. The use of embodiments of the subject PDS techniques can achieve 98.8% performance of an ideal oracle design and outperform existing supply-tracking based approach by 37%. In addition, a design incorporating embodiments of the subject power demand shaping techniques can reduce electrical stress on batteries and improve battery lifetime by up to 26%.

BRIEF DESCRIPTION OF DRAWINGS

FIG. 3A shows short-running traces and FIG. 3B shows long-running traces.

FIG. 7A shows LANL (short-running workload) and FIG. 7B shows Seth (long-running workload).

FIG. 10 shows pseudo programming code of Power Demand Shaping (PDS) technique according to an embodiment of the invention.

DETAILED DISCLOSURE

Figure 1:
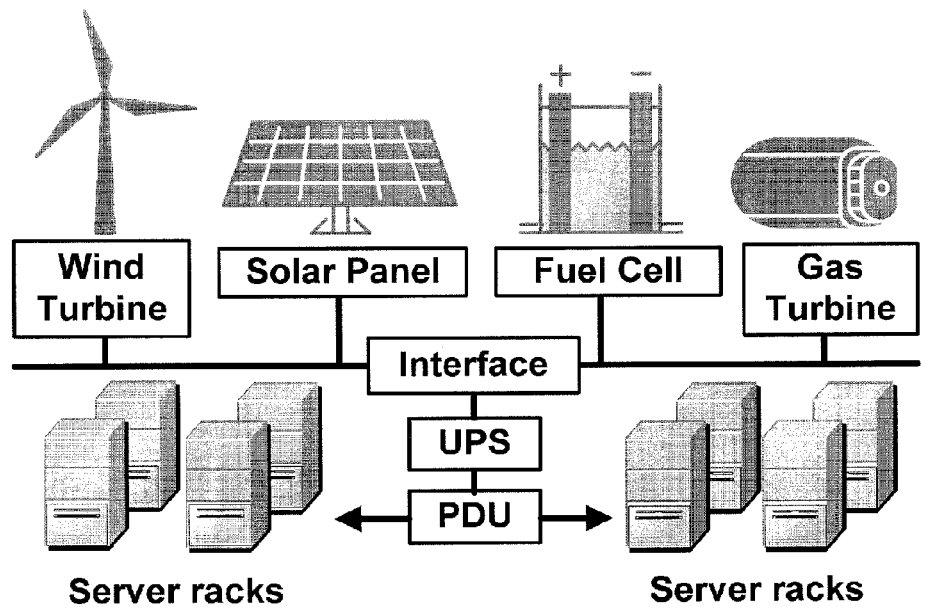
FIG. 1 shows a distributed generation powered data center, where the system can follow customers' load power demand.
Figure 2:
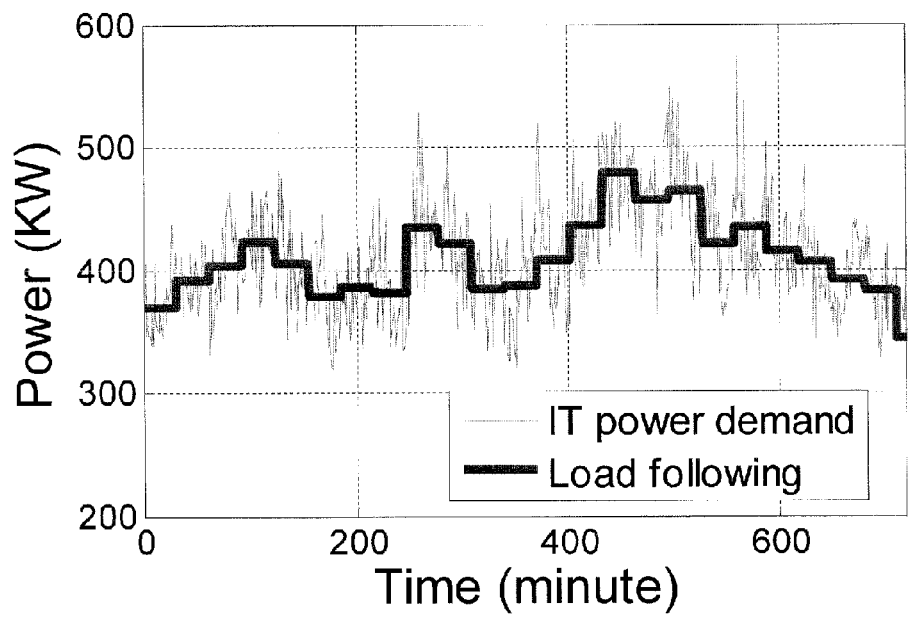
FIG. 2 shows a load following scenario, where frequent IT load fluctuation hinders efficient load following.

Embodiments of the invention relate to a method and system for power demand shaping (PDS) so as to manage power generation and use. Specific embodiments relate to data center power demand shaping to achieve high-performance low-overhead data center operation. Further specific embodiments can incorporate standard (utility power) energy sources, renewable energy sources, or a combination of standard (utility power) energy sources and renewable energy sources. Embodiments of the subject PDS techniques can incorporate trimming the data center load power so as to allow DG systems to follow the power demand efficiently and/or incorporate two adaptive load tuning schemes that can boost data center performance and enable near-oracle operation during power demand trimming process. To implement a cross-layer power optimization scheme, embodiments of the subject invention relate to a power management module that can reside between front-end distributed generation and back-end computing facilities to provide a coordinated tuning between the supply and load.

Embodiments to data centers can utilize onsite distributed generators and incorporate a load power management scheme that uses load following.

Embodiments can use a power demand shaping (PDS) mechanism for optimizing load following efficiency and workload performance in DG-powered systems, such as data centers. Embodiments using the subject PDS mechanism can achieve at least 90%, at least 95%, at least 96%, at least 97%, at least 98%, at least 98.5%, and/or 98.8% of the performance of an ideal oracle design. Compared to recent supply tracking based approach, embodiments using the subject PDS mechanism can improve job turnaround time by 37% on average. To achieve the same performance as such embodiments of the subject PDS mechanism, the state-of-the-art green data centers have to rely on utility power for about 50% of its runtime. Furthermore, utilizing embodiments of the subject PDS techniques can reduce the overhead on energy storage devices, and improves the battery lifespan by up to 26%.

Embodiments of the invention can reduce a data center's reliance on conventional utility grid, thus reducing the data center's carbon footprint. Embodiments of the invention are useful when the utility power is less reliable, as in some developing countries. Further, for data centers that are built in remote areas, an operation that does not depend on the conventional utility grid can help to eliminate the expensive utility power line extensions (around $10 k per km) [16].

Embodiments of the present invention relate to a method and apparatus for fine-tuning load following functionalities of tunable distributed generation (DG) systems to meet time-varying power demand.

Embodiments of the present invention provide a power demand shaping (PDS) technique for fine-tuning load following functionalities of tunable DG systems. Embodiments of the present invention can include first maintaining constant power demand and second rescheduling power generation of DG systems.

In addition, embodiments of the subject invention PDS feature two adaptive power management schemes: DGR Boost and UPS Boost. Thus, embodiments of the subject methods can adaptively fine-tune load following capabilities of tunable DG systems either by leveraging build-in overclocking capabilities of microprocessor under the DGR Boost scheme or by leveraging stored energy of energy storage elements, such as uninterruptable power supply (UPS), battery or flywheel under the UPS Boost scheme. The subject methods can be applied to both distributed energy storage elements and centralized energy storage elements.

The subject methods can be applied to data centers powered by DG systems. The subject methods can also be applied to other infrastructures powered by DG systems.

Advantageously, embodiments of the subject method can remove needs for large energy storage elements, trim load power, fine-tune DG systems to boost performance and energy utilization, and extend lifespan of energy storage elements associated with DG systems.

Figure 8:
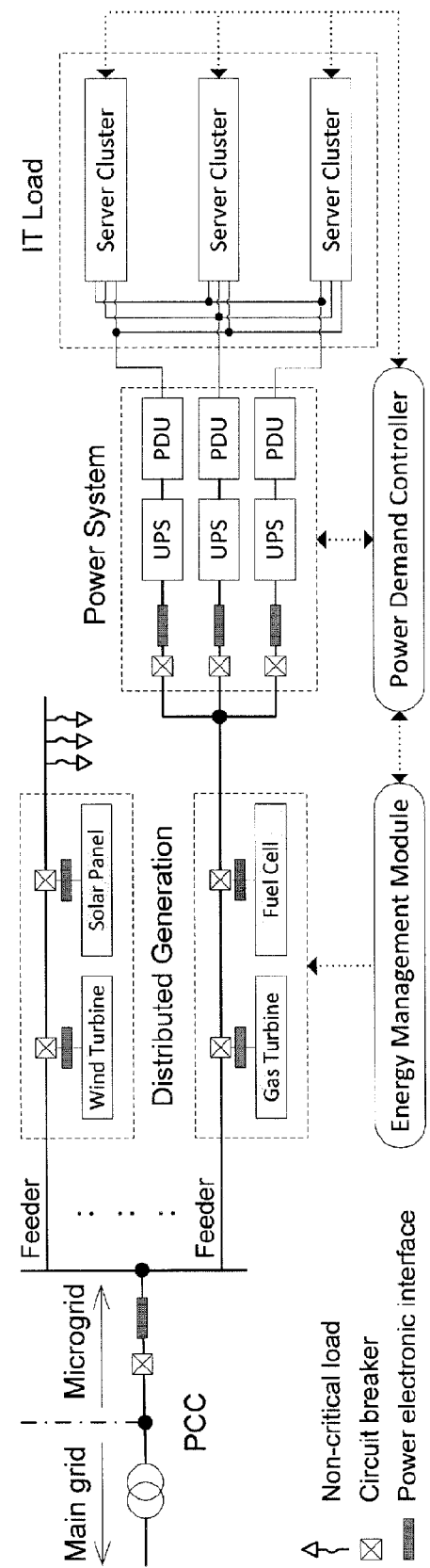
FIG. 8 shows architecture of a distributed generation (DG) powered data center according to an embodiment of the invention.

FIG. 8 depicts an architecture of a DG powered data center with a microgrid power provisioning hierarchy for managing various distributed energy resources. The distributed energy resources, or microsources, such as wind turbine, solar panel, gas turbine and fuel cell, are connected to a group of feeders that provide power to electrical loads. In specific embodiments, the electrical loads can be nodes of a plurality of computing infrastructures. The nodes may include, but not limited to servers, microprocessors or other electronic devices. The distributed energy resources are connected to the feeder via circuit breakers and appropriate power electronic interfaces (PEI). All the circuit breakers and power electronic interfaces are coordinated by a microgrid energy management module (EMM), which provides real-time monitoring and autonomic control of power generation. As can be seen in FIG. 8, microgrid can either stand alone or connect to a main grid of utility through, for example, a point of common coupling (PCC). Micogrid featuring islanded mode, i.e., where the microgrid stands alone, is preferred in certain cases since it may avoid power quality issue in main grid of utility. The EMM and PDC can be merged into a single processor or can shift features between them and/or with one or more other processors.

The connected electrical loads may include both critical loads and/or non-critical loads. As an example, high performance computer (HPC) servers are generally sensitive and mission-critical loads and can require stringent power quality and sufficient power budget. Thus, controllable and stable microsources, such as gas turbines, fuel cells, that can follow demand of critical load can be allocated for HPC servers. For critical loads, each server cluster can be connected to a power distribution unit (PDU) via redundant power delivery paths to ensure uninterrupted operation in event of PDU failure. A specific embodiment relates to utilizing controllable microsources to follow the demand of critical data center load.

In FIG. 8, a power demand controller (PDC) is used to manage the server clusters. The PDC can track job running status of the server cluster and overall cluster power demand. The PDC can also coordinate with job schedulers to optimize computing resource allocation. In addition, the PDC communicates with the EMM of microgrid to obtain current distributed generation levels and dynamically inform the EMM of necessary power generation adjustment.

On the other hand, operations of non-critical loads, such as normal data processing machines, can be regulated or restricted without significantly affecting the needs of users when power generation is not sufficient. Thus, as shown in FIG. 8, non-critical loads can be powered by intermittent renewable power supplies such as wind turbine or solar panel.

Referring to FIG. 8, the EMM monitors and adjusts on-site power generation with, for example, frequency droop control. Frequency droop control uses a small change in the power bus frequency to determine the amount of power that each generator should put into the power bus. The microgrid also includes energy storage elements, such as UPS system, to provide stored energy for necessary start up time for generators' output to ramp up when system changes, such as temporary power differences between supply and load. This can avoid the need for bulky energy storage devices. Both centralized UPS systems and distributed UPS systems can be utilized, though distributed UPS system is preferred due to its higher efficiency and better power management capability.

According to an embodiment of the subject invention, power management that leverages load following capability of DG systems can be carried out by PDS technique, which dynamically and aptly shapes power demand to match the planned power usage curve that yields high load following effectiveness. Specific embodiments can use a power demand shaping technique to better utilize onsite distributed generation in HPC data centers. Embodiments of a power demand shaping technique can include two steps. First, during each control period, the PDS controller can use power capping to maintain a constant power demand, or maintained at or below a target power demand. Second, the power generation level is adjusted for the next load following period by the controller informing the distributed generation EMM to adjust the generation level. This can result in better matching of energy generation with energy load to allow a high-performance sustainable computing.

Figure 9A:
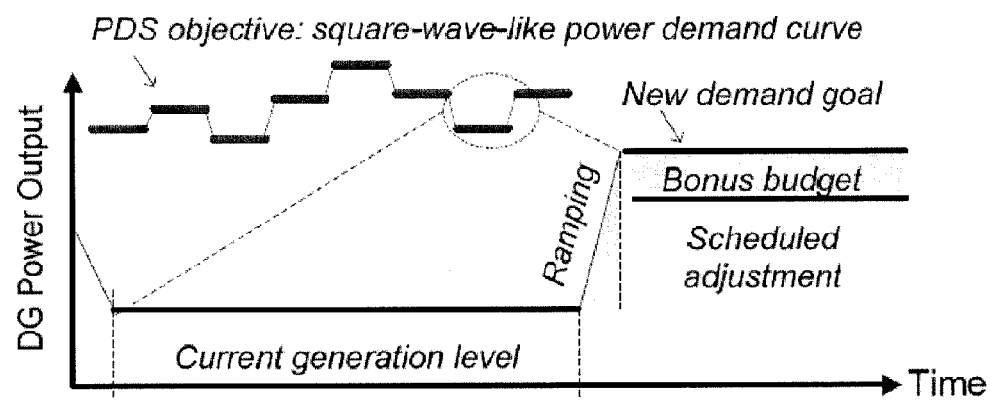
FIGS. 9A-B respectively show an example of time-DG Power Output curve of Power Demand Shaping (PDS) technique and an example of time-Average CPU Frequency curve of Power Demand Shaping (PDS) technique according to an embodiment of the invention.
Figure 9B:
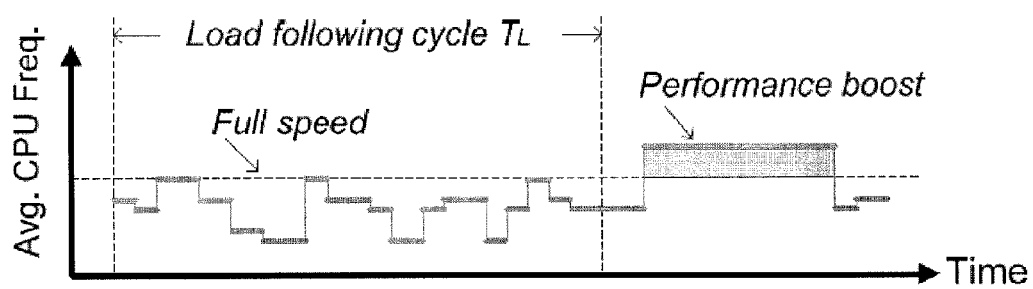

A PDS based controller can transform the power demand with respective to time into one of a variety of shapes. FIG. 9A illustrates a time-varying power demand shaping mechanism resulting in a square-wave-like demand curve. Such a square-wave-like curve is preferred for its convenience, but other shapes can be utilized. In the square-wave-like DC power output shown in FIG. 9A, the amplitude of power output alternates between multiple values. Unlike an ideal square wave, transitions between values of the square-wave-like DC power output is not instantaneous, as changes in power output needs time to ramp up to a higher value or ramp down to a lower value. Time-varying power demand shaping may be represented by other curves including, but not limit to, sine or sine-like waveforms, triangle or triangle-like waveforms, or sawtooth or sawtooth-like waveforms.

With a square-wave-like, or other shape, power demand shaping, a DG system only needs to increase or decrease its generation at each end of the load tuning cycle to meet a new power budget goal. The time duration of load tuning cycle can vary depending on a variety of factors, such as microsources and loads. In specific embodiments, the load tuning cycle can be 5 minutes, 10 minutes, 15 minutes, 20 minutes, 5-20 minutes, or other desired duration. Since load power demand becomes less bursty and fluctuating after tuning, it may be possible to avoid the need to install large energy storage elements onsite. Relatively small energy storage elements, such as UPS may be used to handle the ramping period and the temporary power discrepancy between supply and load. By eliminating unnecessary energy storage capacity, PDS based design becomes more cost-effective and sustainable.

Referring to FIG. 9A, PDS technique is carried out by first executing power capping to maintain power demand at a constant level at or below a target power level, during each control period. When the expected power consumption without any load tuning, L, exceeds a predetermined power demand goal, D, load performance will be scaled down. Whereas when L drops below D, the load performance will be increased to revert to the original power demand level.

In order to maintain power demand at a constant level, node performance level can be dynamically tuned in response to load changes such as when data center load varies. Such dynamic tuning of performance may be achieved via a variety of scheduling schemes. In a specific embodiment, dynamic tuning can be implemented by adjusting the node frequency in a round-robin manner or other manner based on the priorities of system users. Since computing infrastructure may include a plurality of computing nodes, various scheduling schemes may be used for efficiently adjusting the node frequency. In an embodiment using a priority-based scheme each computing node can be associated with a priority and the system can make scheduling choices based on the assigned priorities, adjustment of frequency for each computing node is based on the computing node's priority. In such an embodiment, a group of nodes with higher priority may be adjusted to run at a higher frequency.

Actual performance tuning policies adopted in various scenarios may vary depending on computing node's hardware characteristics, BIOS support, firmware support, and/or software support. Performance states, known as P-states, for example the capability of a microprocessor to switch between different supported operating frequencies to modulate power consumption, may be used to dynamically adjust the CPU frequency of the microprocessor to match the required power budget. By using this technique to run the processor at a less-than-maximum clock frequency, power can be managed. In an embodiment, frequency seeking can be utilized based on an approximation of the power-to-frequency curve for both DFS and DVFS as a linear function. Other power management techniques such as voltage scaling where voltage used in a component is increased or decreased to regulate power consumption may also be used. In an embodiment, the PDS controller monitors power load at every tick, for example, every second, and adjusts the microprocessor's frequency in response to discrepancy between budget and demand.

Embodiments of the subject PDS utilize a time-varying power capping budget. In a specific embodiment, at the end of each control period, the PDC controller will signal the distributed generation EMM to adjust the DC generation level for the next load following period.

In an embodiment, the amount of generation adjustment, or scheduled generation level adjustment, is determined by calculating the mean value of the original power demand in the preceding control period, and then the DG power generation level adjustment is the greater of the calculated mean value and the current demand measurement. The distributed generation will gradually increase its output over a ramp-up period. In an embodiment, a one minute ramp-up duration is assumed for the power generators. During this ramp-up period, the onsite UPS storage is used to provide necessary power support.

In addition to the scheduled generation level adjustment, the PDC controller can also signal the EMM to adjust a bonus power budget. Such a bonus power budget, as shown in FIG. 9A, can address the issue that, after a period of time, the UPS requires recharge to retain its full capacity. In this case, the PDC can signal the EMM to produce additional generation in the next period based on the required UPS charging power. The bonus power budget can also relate to an adaptive load performance scaling scheme that intelligently utilizes DG energy and UPS energy for boosting the load performance. Further details of such adaptive load performance scaling are discussed below.

In FIG. 10, the pseudo code for an embodiment of power demand shaping is shown. The PDC controller monitors the data center load every tick and adjusts node frequency based on the discrepancy between the power budget and the original power demand. In an embodiment, such monitoring can occur every second. Other periods can also be implemented, for example, the clock cycle time of the PDC and/or EMM, or other devices in the system, which can be less than 0.002, 0.003, 0.004, 0.005, 0.01, 0.1, 0.02, 0.03, 0.04, 0.05, 0.06, 0.07, 0.08, 0.09, 1.0, 1.5, 2.0, 2.5, 3.0, 4.0, 5.0, 6.0, 7.0, 8.0, 9.0, and/or 10 seconds. At the end of each cycle $T_L$, or at some other desired frequency and/or timing, the PDC controller adjusts the power budget for a new power demand goal.

Power demand shaping can facilitate load following, but can degrade performance in one or more aspect. Adaptive load performance scaling can help the PDS system to improve job performance while maintaining high load following effectiveness. It can be useful for the power demand shaping protocol to allow the workload to explore additional energy and opportunities. Server power states control, motherboard on/off cycling hard disk drive speed modulation, and/or virtual machine migration and consolidation can be used for load control.

Figure 11:
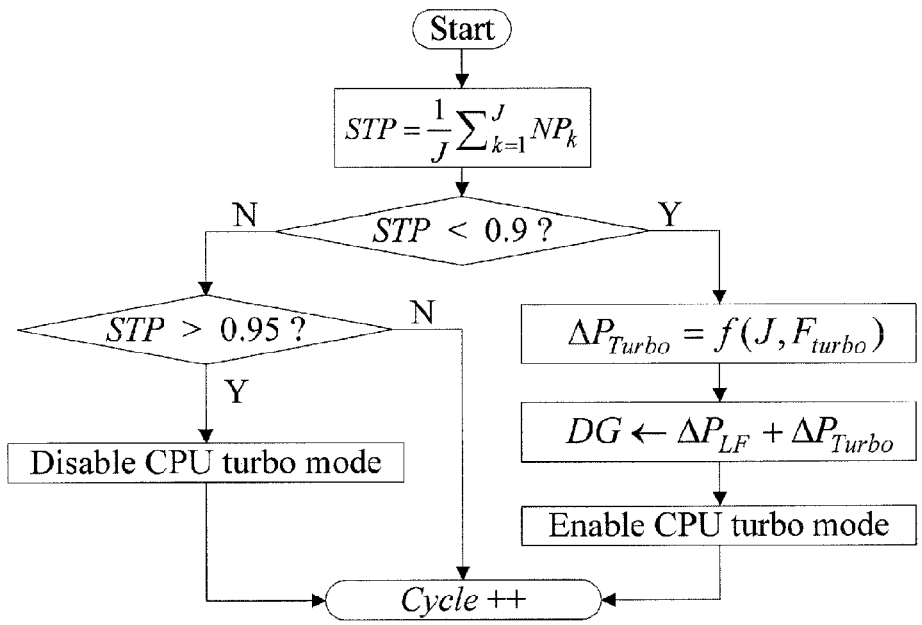
FIG. 11 shows a process flow diagram of DGR Boost scheme according to an embodiment of the invention.

In an embodiment, the distributed generation level can be fine-tuned. If the DG generation is adjusted based solely on historical average, prediction error is often unavoidable, resulting in all of the active jobs suffering low processor speed for the duration of the load tuning interval. FIG. 11 shows one technique to address this problem. The technique shown in FIG. 11 can be referred to as DGR Boost optimization. DGR boost can leverage the build-in over-clocking capabilities of modern processor nodes to minimize the job delay.

To enable DGR Boost, the PDS PDC controller keeps the timing statistics of each active job during runtime. In any given control period, the associated computing node may spend different time periods $t_i$ on different frequency $F_i^{PDS}$ due to the time-varying demand-supply mismatch. If we assume F is the full frequency without performance scaling, we can define a job's normalized progress as:

$$NP_j = \frac{T}{T^{PDS}} = \frac{1}{\sum t_i}\left(\sum_i \frac{\mu F_i^{PDS} + (1-\mu)F}{F} t_i\right) \quad (1)$$

In equation 1, $T^{PDS}$ is the time the task spends under power demand shaping and T is the time the program would spend if no performance scaling were applied. Since frequency scaling only changes the CPU time, we can use mean CPU utilization μ to estimate the proportion of runtime that is affected by power demand shaping. If NP always equals to 1 then PDS is equivalent to a normal job dispatcher that has no performance scaling.

In an embodiment using a DGR Boost scheme, we use NP to evaluate the degree of job slowdown. System throughput (STP) is then defined as the mean NP across all the active jobs.

$$STP = \frac{1}{J}\sum_{k=1}^{J} NP_k \quad (2)$$

At each end of the load following cycle, if STP is lower than a preset goal, the PDS PDC controller can assign bonus power budget to the load. Meanwhile, to actually leverage this power bonus, the PDC controller can further enable CPU frequency boost mode on each node. Such frequency boost mode is well supported in the AMD Turbo Core [25] and the Intel Turbo Boost Technology [26]. By occasionally increasing the CPU speed, important deadlines can be caught up and performance degradation incurred in strict demand shaping can be reduced or avoided.

In a specific embodiment, a scheme to fine-tune intra-cycle load power can be implemented. For short jobs that cannot gain the benefits of DGR Boost, the UPS stored energy can be used to avoid significant performance degradation by a scheme referred to as UPS boost.

Figure 12:
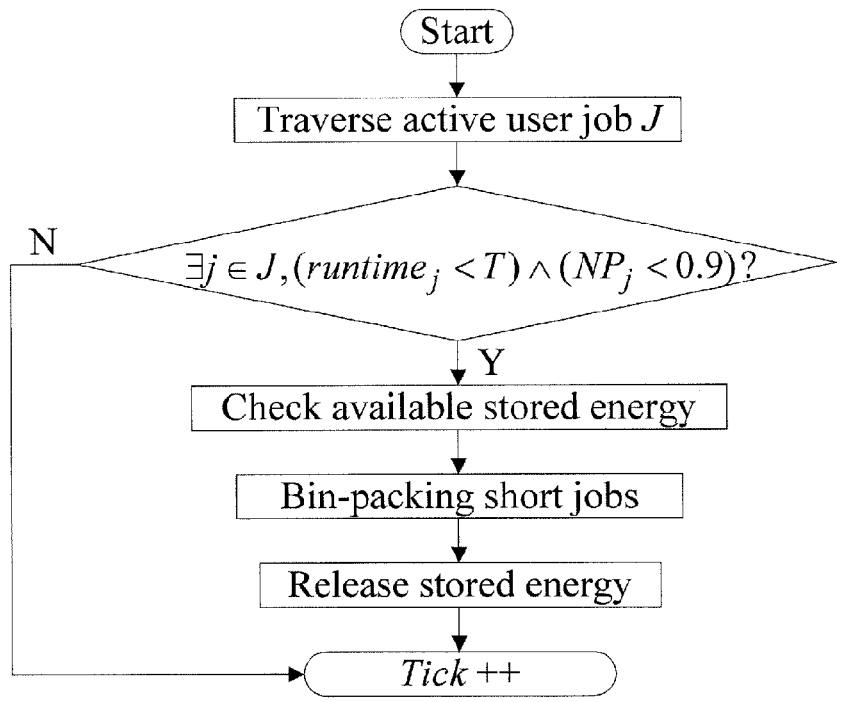
FIG. 12 shows a process flow diagram of UPS Boost scheme according to an embodiment of the invention.

In typical HPC data centers, users are required to submit their job runtime estimations to enable backfilling, which can help maximize cluster utilization. In specific embodiments of PDS, job runtime can be used to sort out short jobs. Short jobs can be defined as tasks that will finish before the current load following cycle ends. In FIG. 12, a specific UPS Boost scheme will first find out all the short jobs that have low normalized progress. These jobs are very likely to miss their deadline without additional performance boost. Afterwards, the controller will check available UPS stored energy and use bin-packing method to power a group of selected short jobs.

Since UPS Boost can improve job performance based on accurate runtime estimates, it encourages users to not overestimate their job runtime. One can use a pricing model [8] to further improve runtime estimation accuracy and increase the effectiveness of UPS Boost.

Implementing load following in data centers is a challenging task, as conventional load following scheme results in sub-optimal energy utilization, low energy storage lifetime, and poor cost-effectiveness.

Figure 3A:
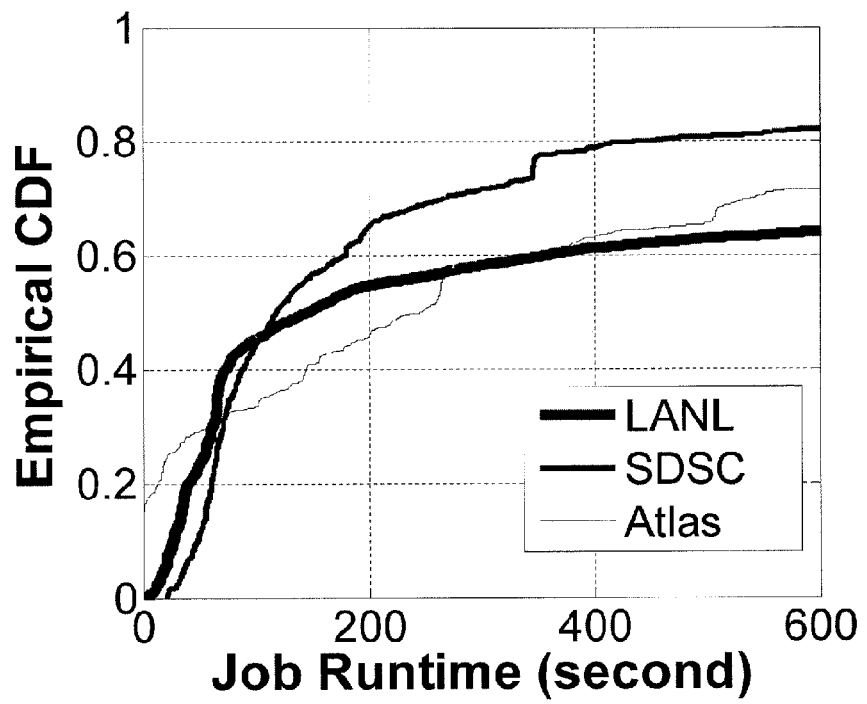
FIGS. 3A-3B show CDF of workload runtime in a zoomed view, where short jobs may result in fine-grained load fluctuations.
Figure 3B:
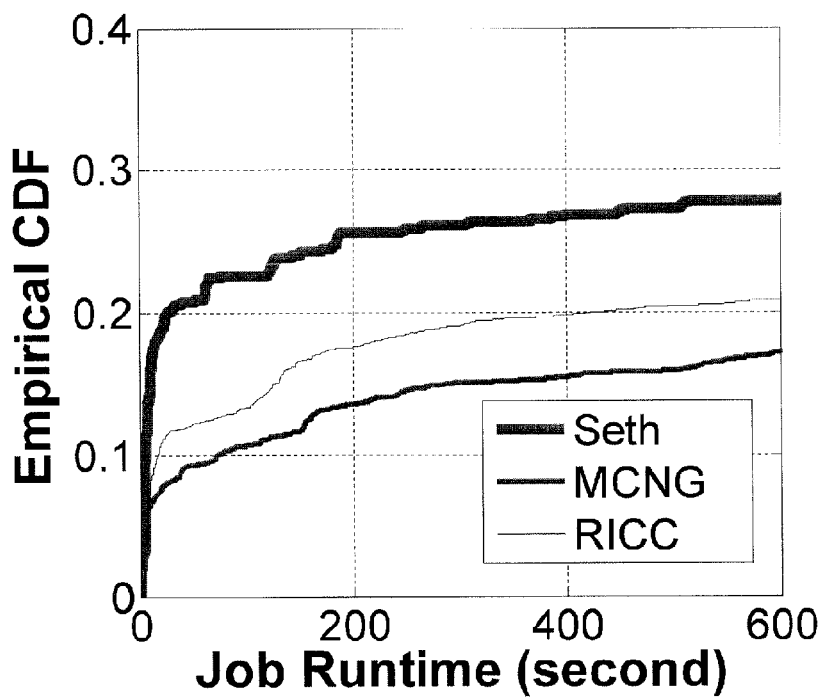

The energy utilization problem when using load following in data centers arises because typical microsources are not able to respond rapidly to the frequent IT load variation. FIGS. 3A-3B show the cumulative distribution functions (CDFs) of job runtime in HPC data centers. Both short-running workload (average job runtime <1 h) and long-running workload (average job runtime >1 h) traces are considered. For short-running workload traces, more than 40% submitted jobs are finished with 100 seconds. For long-running workload traces, nearly 30% of the submitted jobs show short runtime that does not exceed 10 minutes. Most of these short jobs will be granted with individual computing nodes, resulting in transient load power demand fluctuation.

Figure 4:
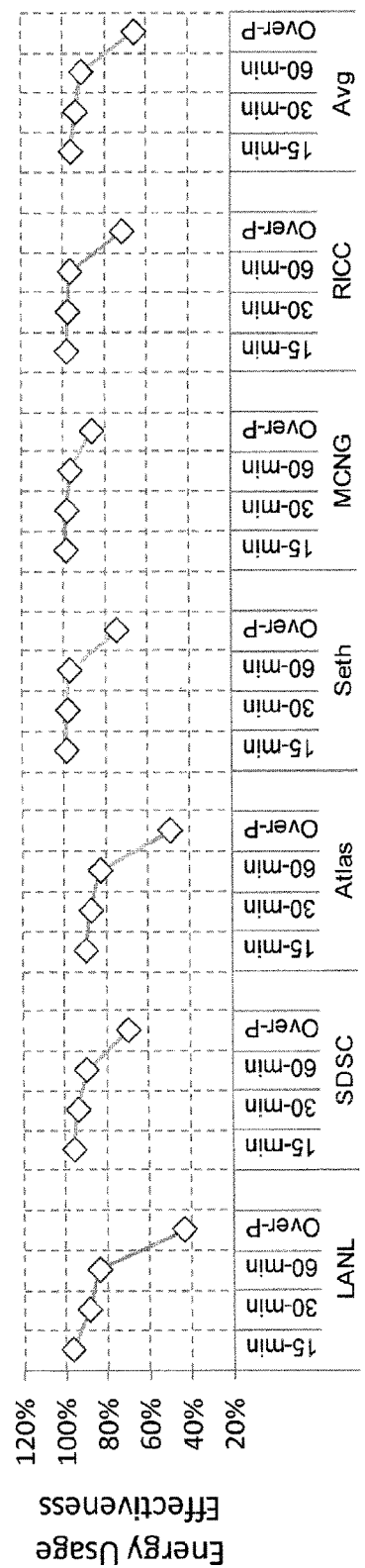
FIG. 4 shows the energy utilization decreases when load following becomes coarse-grained, where over-provisioning based design (Over-P) is the worst-case which always generates the peak power (no load following capacity).

Workload fluctuation can be the major obstacle of achieving high renewable energy utilization in a distributed generation powered data center. FIG. 4 shows the energy utilization of data center with varying load following intervals. The DG power output is dynamically adjusted based on the peak power demand of the last load following period. For a 15-min load following, the energy utilization is 97% on average. For a 60-min load following, the energy utilization drops to 90% on average. Apparently, the energy efficiency decreases as load following becomes coarse-grained. However, even if load following is performed on an hourly basis, the energy utilization still outperforms over-provisioning (Over-P) based design, which has an average energy utilization of 66%.

Batteries are critical components in both distributed generation systems and uninterruptable power supply (UPS) systems. These energy storage devices are prone to electrical wear out under irregular charging and discharging regime [19]. Throughout the history of battery discharge event, two factors affect the battery failure rate significantly. The first is the depth of discharge (DOD), which indicates how much stored energy has been used (0% DOD=full capacity, 100% DOD=empty). The second factor is the discharge current, which represents the rate of discharging. The battery lifetime will be decreased whenever the battery cell is discharged at a faster rate than the rated rate [20].

Using a battery lifetime evaluation method that captures the aforementioned two primary determinants of battery failure [20]. This technique predicts the battery lifespan based on manufacture's battery performance data and the measured battery usage record of duration T. Assume the rated charge life (in Ah) is $L_R$. The estimated lifetime, L, is given by:

$$L = \frac{TL_R}{\sum_i d_i^{eff}} = \frac{TL_R}{\sum A_i B_i d_i^{act}}, \quad (3)$$

where $d_i^{eff}$ the effective discharge of a single discharge event, $d_i^{act}$ is the measured actual discharge, $A_i$ is the scaling factor that represents the capacity degradation effect under high discharging rate, and $B_i$ is the scaling factor that represents the lifetime degradation effect under high DOD. Both scaling factors are calculated from the best-fit functions of the manufacture's data sheets:

$$A_i = f_1(C_R, I_d) \quad (4)$$

$$B_i = f_2(D_R/D_A) \quad (5)$$

Figure 5A:
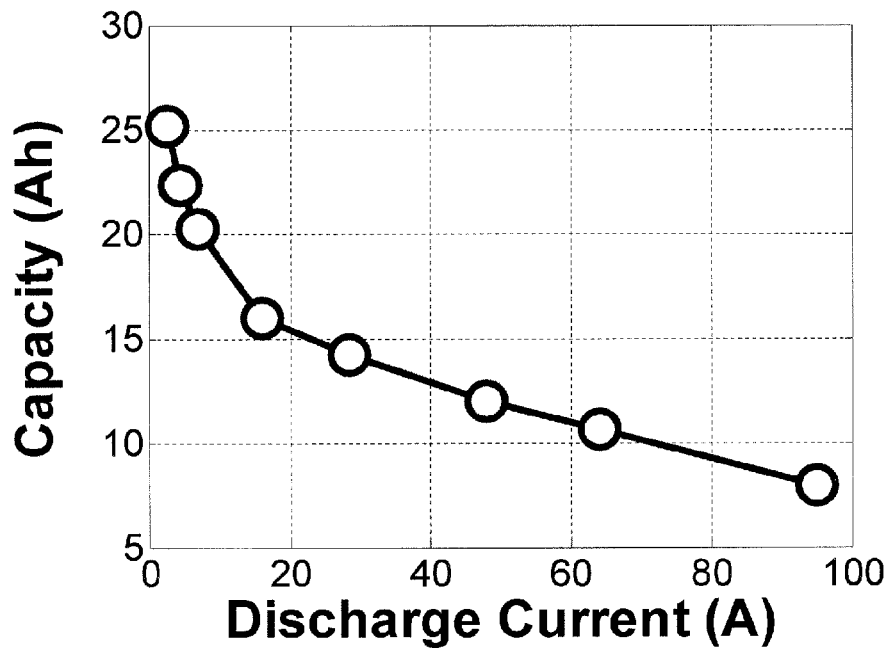
FIGS. 5A-5B show performance data of VRLA battery, where high DOD and discharge rate will shorten the battery lifespan.
Figure 5B:
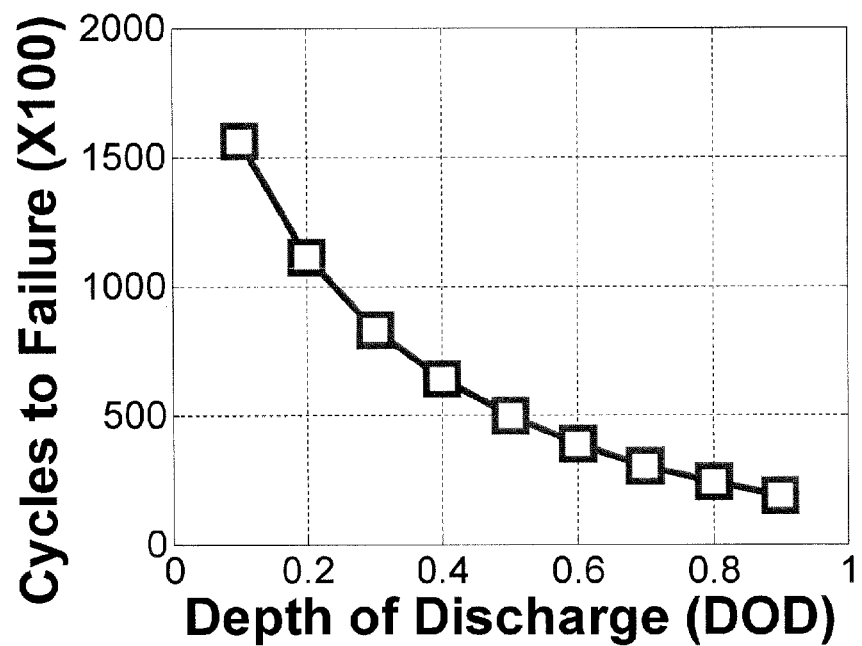

In equations 4 and 5, $A_i$ is a function of the rated amp-hour capacity ($C_R$) and the actual discharging current ($I_d$); $B_i$ is a function of the rated depth of discharge ($D_R$) and the measured actual depth of discharge ($D_A$). We model a 12V 6-cell valve-regulated lead-acid battery (VRLA), which is widely used in today's UPS systems. FIG. 5 shows the battery behavior under varying discharging current and DOD. While the rated capacity is 24 Ah at a 20-hour discharging rate, the capacity drops to only 12 Ah at a 15-min discharging rate (15 min is the typical UPS ridethough duration). Compared to the 40% constant DOD operation, the battery life will decrease by 50% at constant 80% DOD.

Figure 6:
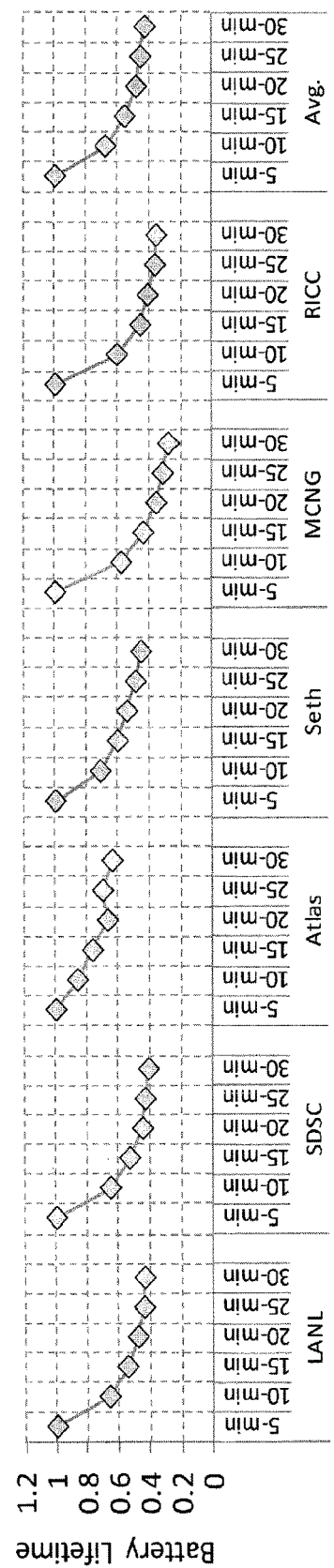
FIG. 6 shows normalized battery lifespan under different load following intervals, where conventional load following schemes cannot handle the busty load and therefore incur varying degree of battery wear-out.

In FIG. 6, the load following policy is to adjust the distributed generation output based on the mean power demand of the last period. The minimal load following interval is 5-min and all the results at other interval values are normalized to it. Since the actual granularity of load following depends on several factors (e.g., the generator characteristic, control latency, and operation policy), the battery lifespan can vary significantly. If the best achievable (or economically feasible) load following interval is 30-min, the system will incur 57% battery lifetime degradation. This also implies that if the load power demand becomes less fluctuating, we can achieve 1.3× lifetime improvement.

Depending upon the load following schemes, the total cost of ownership (TCO) may vary. The main reason is that each load following scheme requires different amount of onsite battery capacity. Poor load following management and bursty load power demand increase the burden of regulation significantly, and therefore require high-capacity energy storage devices.

Figure 7A:
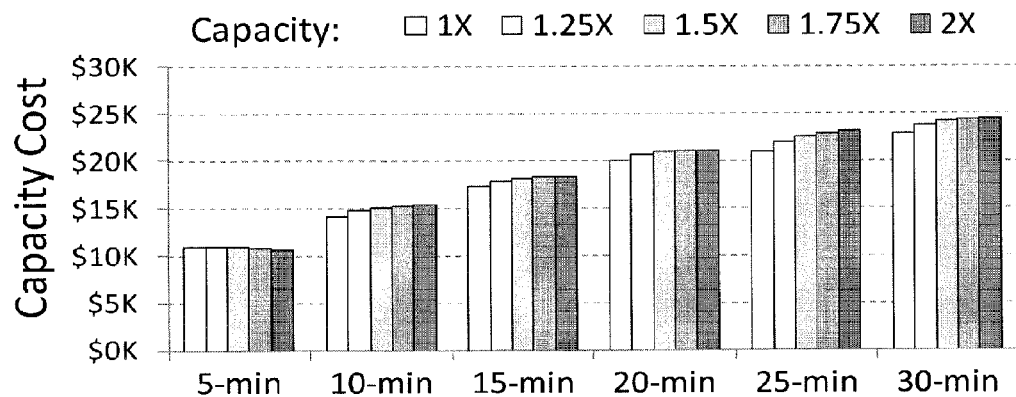
FIGS. 7A-7B show battery cost under different load following intervals and capacity, where due to frequent power demand fluctuation, small battery capacity does not show the cost advantage it should have.
Figure 7B:
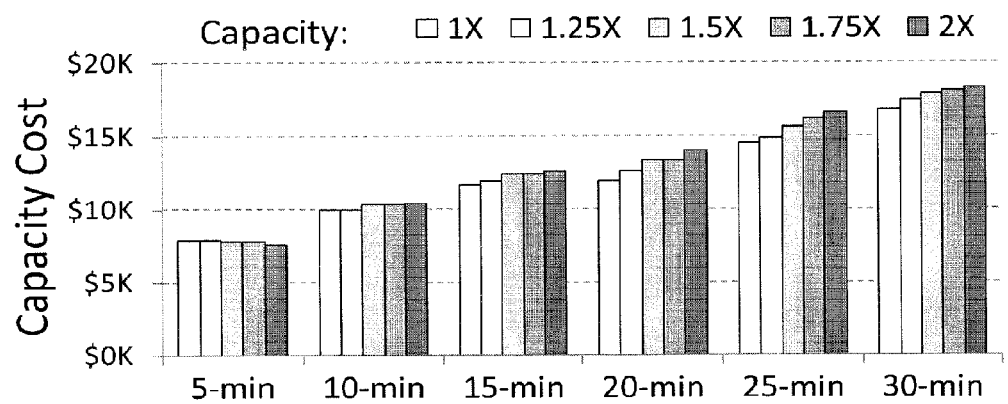

FIGS. 7A-7B show the amortized capital expenditure (CapEx) of batteries under varying capacities and load following intervals. We assume a 10 MW data center scale for both short-running and long-running workloads. For each load tuning interval value, we calculate the minimum required battery capacity (i.e., 1×) that can safely meet the load power regulation requirement. We then scale up the battery installation capacity (up to 2×) to perform a sensitivity analysis. We calculate the amortized cost over the battery's lifetime. As shown in FIGS. 7A-7B, small capacity does not necessarily mean cost saving since each battery cell in this case experiences more regulation events and fails quickly. Compared to battery capacity scaling, load following shows greater influence on the CapEx and results in up to 50% cost savings on batteries.

Due to data center load power fluctuation, peak power based load following incurs energy cost, while mean power based load following incurs battery capacity cost. Batteries are crucial energy regulation components but incur up to 57% lifetime degradation under fluctuating IT load. Overall design efficiency can be improved by integrating load following into data center operation in accordance with various embodiments of the invention.

We model implementation of embodiments of systems utilizing power demand shaping techniques in accordance with embodiments of the invention. A HPC data center simulation infrastructure that takes real-world workload traces as input can be utilized to model the performance of systems using PDS. A discrete-event simulator can be used and can put each user's request into a queue and wait to grant allocation if computing nodes are available. Each job request in the trace can have exclusive access to its granted nodes for a bounded duration. Such a trace-driven discrete-event simulation framework has been adopted by several prior studies on investigating data center behaviors and facility-level design effectiveness [6, 27, 28].

We model an IBM System x3650 M2 (2.93G Intel Xeon X5570 processor) high-performance server that supports Intel Turbo Boost technology. While the number of processor performance states (P-states) is processor specific, we assume 12 different P-states as indicated in [29]. The minimum frequency is 1.6 GHz and the normal frequency is 2.9 GHz. In Turbo Boost mode, the processor could temporarily increase the CPU frequency by up to 14%. For this model, we only increase the frequency moderately (i.e., 10%) when turbo boost is enabled.

Our power model uses CPU utilization as the main signal of machine-level activity. There has been prior work showing that CPU utilization traces (sampling periods range from tens of seconds to minutes) can provide fairly accurate server-level power prediction [30]. According to the published SPEC power data, the modeled system consumes 244 Watts at 100% utilization and 76.3 Watts when idle [31]. Note that our estimates of benefits from power demand shaping are conservative; in real applications, data center workload can cause much more brief power spikes than what the simulator can capture [32], causing even worse performance degradation on a non-PDS based design. Specific embodiments utilize UPS's with up to a 20 VA out, up to a 200 VA, up to a 250 VA, up to a 1000 VA, up to a 10 kVA, up to a 25 kVA, and/or up to a 50 kVA output capability.

We simulate the power behavior of distributed generation system on per-second time scale, which is in tune with our data center simulator. The distributed generator adjusts its output on a coarse-grained interval (10-minute as default value) and batteries respond to the fluctuating computing load. We adopt microsource optimization model HOMER in our simulator [33]. Developed by the National Renewable Energy Laboratory, HOMER simulates both conventional and renewable energy technologies and evaluates the economic and technical feasibility of a large number of power system options.

Table 2 shows the performance parameters we used in our evaluation. All the parameter values are carefully selected based on manufacturer specifications, government publications and industry datasheet. For example, we use published emission factors to calculate carbon emissions [34]. We assume a 1-minute constant duration for the distributed generation to ramp up when performing load following. The battery cycle life is set to be 10,000 times and we calculate the capacity degradation of battery cell based on its discharging profile which includes detailed information of each discharging event.

TABLE 2

DG parameters used in the evaluation [16-20]

| Inputs | Typical Value | Value Used |
|---|---|---|
| Battery life cycle | 5,000~20,000 times | 10,000 times |
| Ramping time | 10 sec~5 min | 1 min |
| Rated DOD | 0.8 | 0.8 |
| Bettery Efficiency | 75%~85% | 80% |
| Battery cost | $1~$3 per Ah | $2 per Ah |
| Emission factors of grid | 0.6 kg~1 kg $CO_2$/KWh | 0.9 kg/KWh |

We use a real-world workload trace from a well-established online repository [35]. These workload logs are collected from large production systems around the world and have been scrubbed by the administrator to remove anomalous data that could skew the performance evaluation on different scheduling schemes [36]. We use five key task parameters of each trace file: job arrival time, job start time, job completion time, requested duration, and job size in number of granted computing nodes. As shown in Table 4, we select six 1-week workload traces that have different mean utilization level and mean job runtime. Our simulator uses batch scheduling, the standard method for sharing computing resources among multiple users. The job scheduling policy is first come first serve (FCFS). We examine the data center load and distributed generation budget at each fine-grained simulated timestamp.

TABLE 3

The evaluated data center workload traces [35]

| Trace | Description | Avg. Load | Mean inter-arrival Time | Avg. Job Run Time | |
|---|---|---|---|---|---|
| LANL | Los Alamos Lab's 1024-node connection machine | 56% | 4.9 min | 31.6 min | Short |
| SDSC | San Diego Supercomputer Center's Blue Horizon HPC | 60% | 3.7 min | 33.0 min | |
| Atlas | Lawrence Livermore Lab's 9216-CPU capability cluster | 46% | 10.6 min | 36.8 min | |
| Seth | A 120-node European production system | 85% | 20.6 min | 6.2 h | Long |
| MCNG | A 14-cluster data center, 806 processors in total | 89% | 2.2 min | 11.1 h | |
| RICC | A massively parallel cluster with 8000+ processors | 52% | 0.9 min | 16.6 h | |

TABLE 4

The evaluated power management schemes

| Scheme | Description |
|---|---|
| Oracle | Ideal power provisioning with no performance overhead |
| LF | Existing load following based design |
| ST | Existing supply tracking based design |
| PDS-s | PDS without optimization (i.e., uses strict power budget) |
| PDS-r | PDS + adaptive load tuning (DGR Boost & UPS Boost) |

The benefits of applying power demand shaping in accordance with specific embodiments of the subject invention to distributed generation powered data centers have been modeled and will be discussed. In Table 4, Oracle is defined as an ideal design that has a priori knowledge of load patterns and can always meet the fluctuating data center power demand with no performance overhead. Oracle represents the optimal energy balance scenario that one can achieve with renewable energy resources. Different from Oracle, LF is defined as a conventional load following based scheme that has heavy reliance on energy storage. ST represents existing power supply driven design that aims at managing the computational workload to match the renewable energy supply [4, 6, 8]. PDS-s is an embodiment of the subject power demand shaping technique without optimization. PDS-r is an embodiment of the subject power shaping technique, referred to as relaxed power demand shaping, that features adaptive workload-aware performance scaling.

TABLE 5

Mean job turnaround time of ST under different renewable generation levels (normalized to Oracle)

| | LAN | SDSC | Atlas | HPC | MCNG | RICC |
|---|---|---|---|---|---|---|
| 200 W/$m^2$ | 2.92 | 1.60 | 1.64 | 7.25 | 1.31 | 1.24 |
| 400 W/$m^2$ | 2.10 | 1.51 | 1.66 | 9.27 | 1.12 | 1.29 |
| 600 W/$m^2$ | 2.89 | 1.41 | 1.37 | 5.91 | 1.08 | 1.10 |
| 800 W/$m^2$ | 5.27 | 1.34 | 1.30 | 7.00 | 1.06 | 1.08 |

Performance is important for various embodiments of the subject power demand shaping technique. Although the then-novel concept of tracking renewable power budget has shown great success on reducing IT carbon footprint, it has difficulty ensuring improved performance and sustainability simultaneously.

Table 5 evaluates the performance degradation of supply tracking based design under different wind energy intensity. We have scaled the wind power traces so that the average wind power budget equals the average data center power demand. When renewable energy generation drops or is intermittently unavailable, we scale down the node frequency and defers job execution if it is necessary.

The results in Table 5 show that data centers designed to track the variable power supply may incur up to 8× job runtime increase. The geometric mean value of turnaround time increase is 59%. It also shows that workload performance heavily depends on renewable power variation behavior and data center load pattern. We have observed that occasionally the renewable energy variation pattern is totally uncorrelated with the load power demand. There is no guaranteed performance lower bound since both the user behavior and environment conditions are stochastic.

Figure 13:
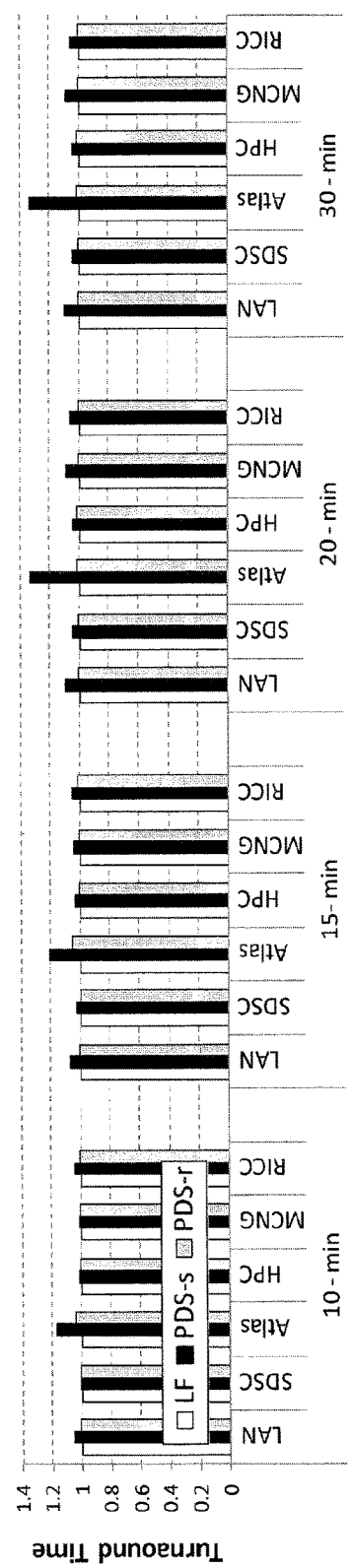
FIG. 13 shows a chart of job turnaround time with various load following intervals for various workload traces where all results are normalized with respect to results of Oracle design.

In contrast to supply tracking based design, load following fundamentally changes this situation. FIG. 13 shows the mean job turnaround time under varying load following interval. All the results are normalized to Oracle, which has no performance scaling and maintains full-speed server operation with sufficient power budget. The average job turnaround time increase of PDS-s is 8.0%, which outperforms supply tracking based design most of the time. An embodiment of the subject power demand shaping technique, PDS-r, shows 1.2% mean performance degradation compared to Oracle. This means that the subject power demand shaping technique with adaptive load tuning (i.e., DGR Boost and UPS Boost) can yield a 37% improvement over existing supply-tracking based designs.

Figure 14A:
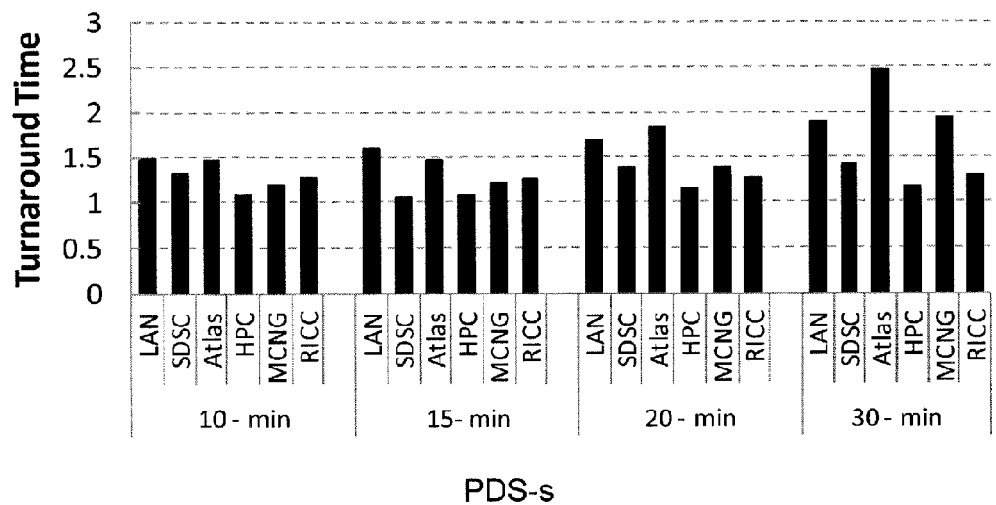
FIGS. 14A-B respectively show a chart of mean turnaround time of the worst 5% jobs of PDS-s (FIG. 14A) and of PDS-r (FIG. 14B) where all results are normalized with respect to results of Oracle design.
Figure 14B:
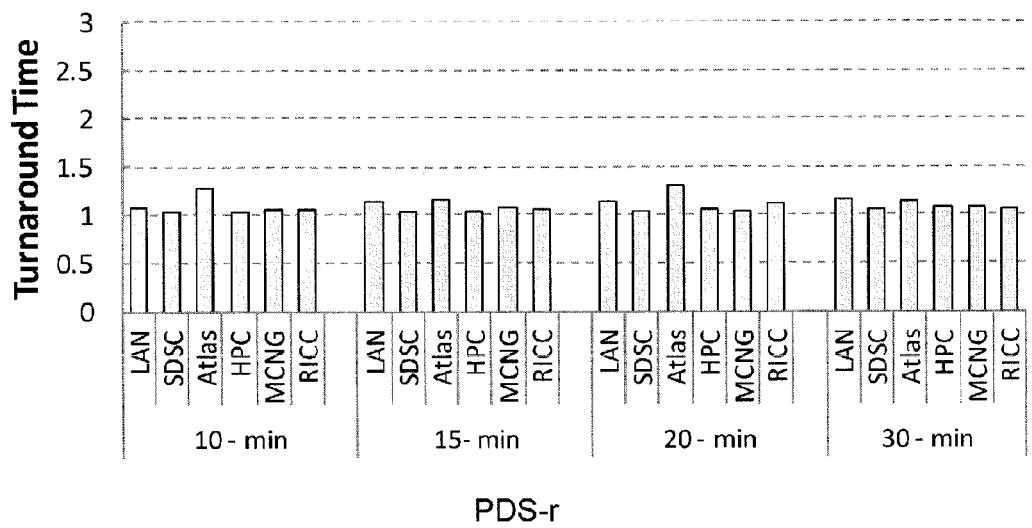

In addition to the mean performance statistics, FIGS. 14A and 14B show the results for the worst-case scenario in terms of the mean job turnaround time of the worst 5% jobs. PDS-s and PDS-r show 47% and 9.6% performance degradation, respectively. Therefore, PDS-r shows a better performance guarantee in terms of the worst-case performance degradation.

Figure 15:
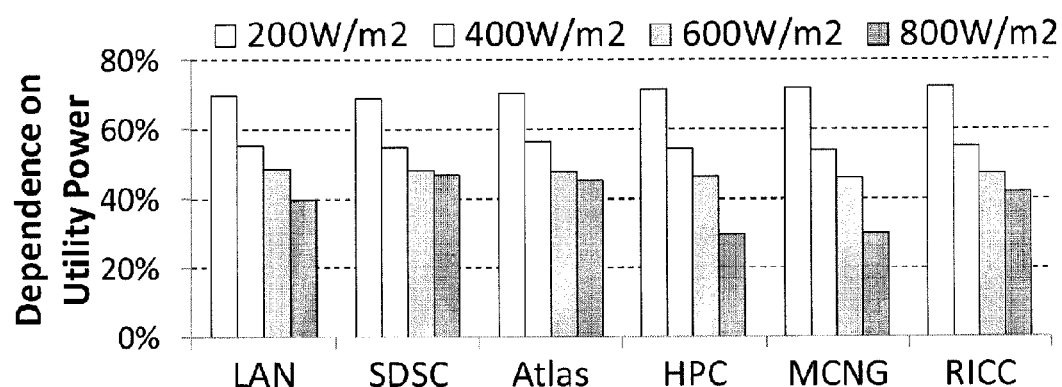
FIG. 15 shows a chart of dependence on utility power for various workload traces.

The state-of-the-art green energy-aware scheduling schemes normally rely on the utility grid as backup [4, 6, 8]. To achieve the same performance as PDS-r, these designs have to increase their reliance on the utility, as shown in FIG. 15. The percentage of time that utility power is used is between 30% and 70%. The geometric mean value across all workloads and renewable generation levels is 51%. Heavy reliance on utility means increased carbon footprint, which goes against the original intention of sustainability.

Existing load following schemes require substantial support from batteries. Aggressive charging/discharging events typically result from IT load fluctuations, which can shorten the lifetime of these expensive batteries, or other energy storing devices, and deplete the stored energy quickly. Embodiments of power demand shaping techniques require much fewer regulation services and allow one to have better UPS-based energy balance management. In the following discussion, we assume the UPS experiences 4 discharge cycles per day on average due to normal data center operation and maintenance needs. We evaluate the UPS lifetime based on the additional effective discharge cycles that result from load following and PDS.

Figure 16A:
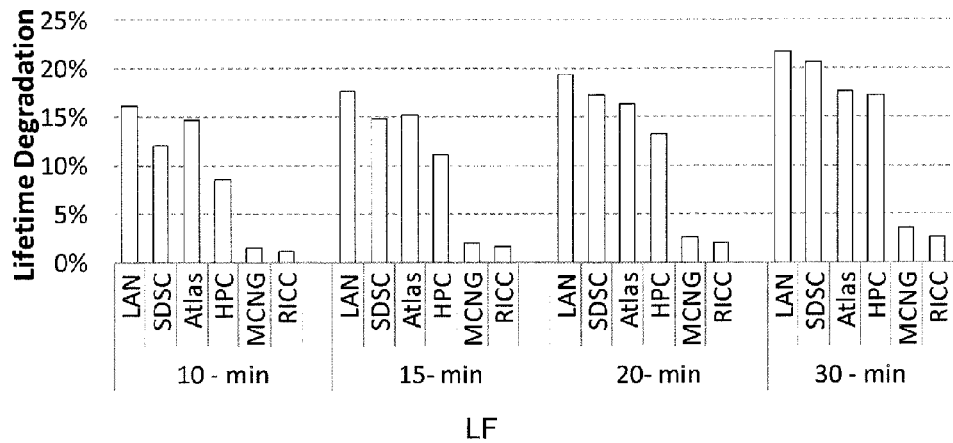
FIGS. 16A-B respectively show a chart of battery lifetime degradation under various power management schemes with distributed UPS for LF based design (FIG. 16A) and for PDS based design (FIG. 16B).

In FIG. 16A the impact of load following on the lifetime degradation of distributed UPS systems is shown. The lifetime degradation due to load following varies between 3% and 21%, depending on the data center load behavior. When we increase the interval of load following cycles, the battery wear out is intensified. This is because too much of the load power fluctuation will show up as intra-cycle regulation if the time chosen for load following is too long.

Figure 16B:
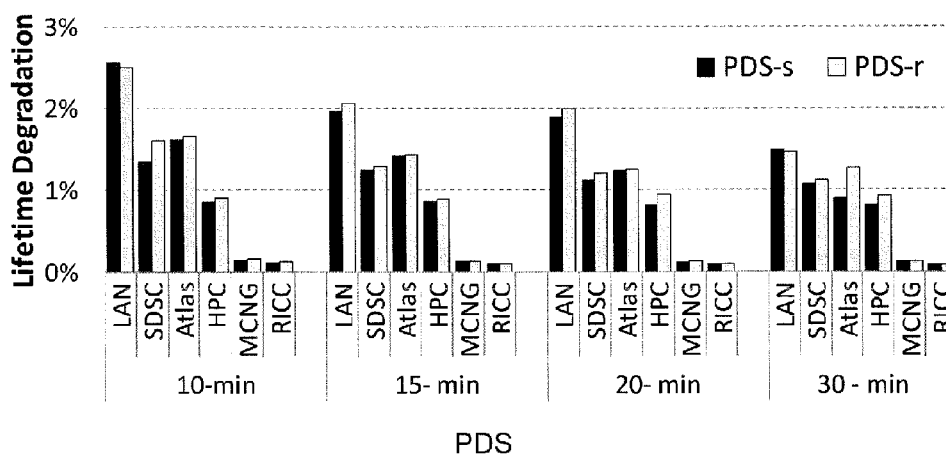

Compared to conventional load following, embodiments of the PDS techniques result in much lower UPS stress. In. FIG. 16B, both PDS-s and PDS-r show less than 3% battery lifetime degradation. Although PDS-r explores additional stored energy to perform performance boost, its impact on UPS system is very similar to that of PDS-s. Note that for embodiments of the subject power demand shaping technique, the battery wear out problem is alleviated when we increase the interval of load following cycles. This trend is different from what we observed in LF. The reason is that batteries are mainly used to provide power shortfall during generator's ramp-up period in PDS based systems. When we increase the load following intervals, we also lower the frequency of generator ramp-up, the dominant factor of battery discharging.

Figure 17:
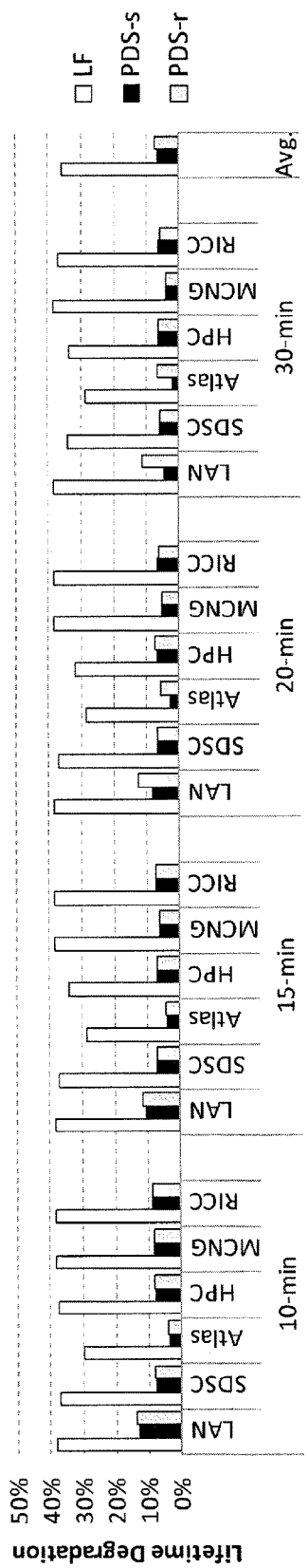
FIG. 17 shows a chart of battery lifetime degradation under various power management schemes for various designs with centralized UPS.

Another advantage of embodiments of the subject power demand shaping techniques is that conventional centralized UPS systems can be used to assist power demand shaping. A drawback of centralized UPS systems is that they cannot provide a fraction amount of energy—all the data center load has to be switched between the main supply and UPS. Consequently, during each UPS ride-through, the battery cells have to experience much higher discharge current. The immediate result of this is significantly decreased UPS lifetime. As shown in FIG. 17, when using a centralized UPS system, LF results in 35% lifetime degradation on average. The lifetime degradation of PDS-s and PDS-r when using a centralized UPS system is 6% and 7%, respectively. Therefore, embodiments of the subject power demand shaping techniques still maintain acceptable overhead and can be utilized with centralized UPS systems.

Figure 18:
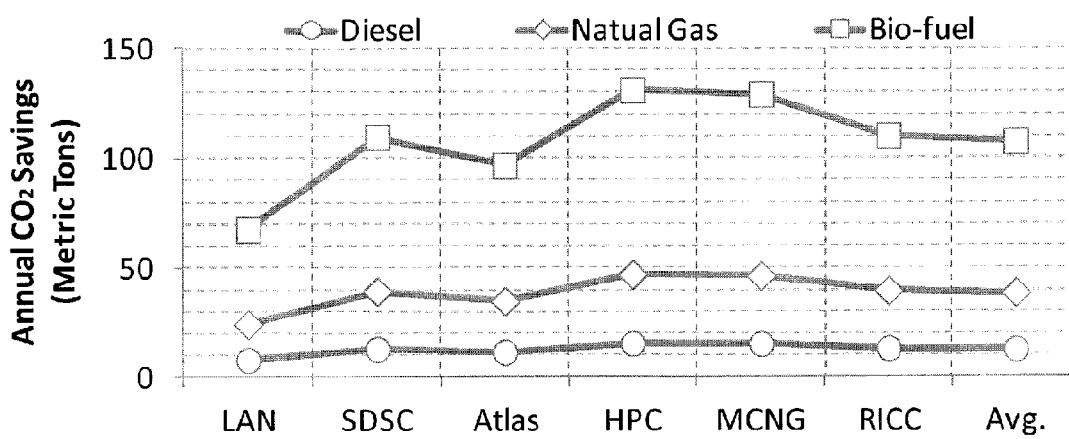
FIG. 18 shows a chart of annual greenhouse gas emission savings for various types of fuels according to an embodiment of the invention.

We evaluate the environmental impact of DG powered data centers in terms of the annual emission savings. We mainly consider carbon dioxide, which is the most important gas within the context of greenhouse gas emissions. Since the distributed generation system support a variety of fuels, the carbon footprint may vary. The results shown in FIG. 18 are based on a 10 MW data center. Low-carbon fossil fuels such as natural gas and diesel, although not 100% sustainable, can still reduce 38 and 12 metric tons of $CO_2$ per year. If we use bio-fuel (as well as hydrogen) based distributed generation, we can achieve 100 metric tons per year on average. Note that with embodiments of the subject power demand shaping techniques, neither of these emission savings is at the cost of decreased data center performance or availability.

Specific embodiments can use the mean of the total power usage for the last two control periods, or other functions of the total power usage to determine the power generation level for the next control cycle. The length of the control periods can change, can change dynamically, or can remain the same. The period at which the total power usage is measured during the control period can be the same, for example at the clock cycle, or change depending on the circumstances.

Embodiment 1. A method for managing a power generation system and at least one load, comprising:
providing a power demand controller; and
providing an energy management module,
controlling one or more of at least one power usage used by a corresponding at least one load during a control period via the power demand controller, wherein the power demand controller controls the one or more of the at least one power usage such that a total power usage used by the at least one load during the control period is less than or equal to a power generation level for the control period;
controlling one or more of at least one power output of a corresponding at least one power generator during the control period via the energy management module, wherein the energy management module controls the one or more of the at least one power output such that a total power output of the at least one power generator during the $n^{th}$ control period is at least the power generation level for the $n^{th}$ control period.

Embodiment 2. The method according to embodiment 1, wherein the control period is a $n^{th}$ control period of a plurality of consecutive control periods, (a first control period, a second control period, . . . , a $(n-1)^{th}$ control period, the $n^{th}$ control period, a $(n+1)^{th}$ control period, . . . ), wherein each control period of the plurality of control periods has a time duration of Tcp.

Embodiment 3. The method according to embodiment 2, wherein the power generation level for the control period is determined prior to the control period, wherein the power generation level for the $n^{th}$ control period is based on at least a total power usage for the $(n-1)^{th}$ control period, wherein the power demand controller signals the energy management module the power generation level for the $n^{th}$ control period during the $(n-1)^{th}$ control period.

Embodiment 4. The method according to embodiment 3, further comprising determining a power generation level for the $(n+1)^{th}$ control period, wherein the power generation level for the $(n+1)^{th}$ control period is based on at least the total power usage for the $n^{th}$ control period, wherein the power generation level for the next $(n+1)^{th}$ control period is based on at least the total power usage for the $n^{th}$ control period, wherein the power demand controller signals the energy management module the power generation level for the $(n+1)^{th}$ control period at, or before, an end of the $n^{th}$ control period.

Embodiment 5. The method according to embodiment 2, wherein the at least one load is two or more loads, wherein the power demand controller controls one or more of a corresponding two or more power usages used by the two or more loads, wherein the total power usage is the total power usage used by the two or more loads, wherein the at least one power generator is two or more power generators, wherein the energy management module controls one or more of a corresponding two or more power outputs of the two or more power generators, wherein the total power output is the total power output of the two or more generators.

Embodiment 6. The method according to embodiment 4, wherein the power generation level for the $(n+1)^{th}$ control period is a greater of a mean value of the total power usage during the $n^{th}$ control period and the total power usage at a point in time during the $n^{th}$ control period, wherein the point in time during the $n^{th}$ control period is an end of the $n^{th}$ control period, further comprising:

monitoring the total power usage during the $n^{th}$ control period; and calculating the mean value of the total power usage during the $n^{th}$ control period.

Embodiment 7. The method according to embodiment 2, further comprising:

providing one or more energy storage elements configured to provide power to at least one of the two or more loads, such that the total power usage is higher than the total power output at least one point in time during the $n^{th}$ control period.

Embodiment 8. The method according to embodiment 7, wherein the one or more energy storage elements are configured to receive power from the at least one generator.

Embodiment 9. The method according to embodiment 7, wherein the power demand controller controls providing power from the one or more energy storage elements to the at least one of the at least one load.

Embodiment 10. The method according to embodiment 5, further comprising:

monitoring the total power usage at one or more points in time during the $n^{th}$ control period.

Embodiment 11. The method according to embodiment 10, further comprising:

providing one or more energy storage elements configured to provide power to at least one of the at least one load, such that the total power usage can be higher than the total power output.

Embodiment 12. The method according to embodiment 1, wherein the control period is a $n^{th}$ control period of a plurality of consecutive control periods, (a first control period, a second control period, . . . , a $(n-1)^{th}$ control period, the $n^{th}$ control period, a $(n+1)^{th}$ control period, . . . ).

Embodiment 13. The method according to embodiment 1, further comprising determining a power generation level for the $(n+1)^{th}$ control period.

Embodiment 14. The method according to embodiment 13, wherein the power generation level for the $(n+1)^{th}$ control period is based on at least the total power usage for the $n^{th}$ control period.

Embodiment 15. The method according to embodiment 13, wherein the power demand controller signals the energy management module the power generation level for the $(n+1)^{th}$ control period during the $n^{th}$ control period.

Embodiment 16. The method according to embodiment 15, wherein the power demand controller signals the energy management module the power generation level for the $(n+1)^{th}$ control period at, or before, an end of the $n^{th}$ control period.

Embodiment 17. The method according to embodiment 2, wherein each control period of the plurality of control periods has a time duration of Tcp.

Embodiment 18. The method according to embodiment 1, wherein the at least one load is two or more loads, wherein the power demand controller controls one or more of a corresponding two or more power usages used by the two or more loads, wherein the total power usage is the total power usage used by the two or more loads.

Embodiment 19. The method according to embodiment 1, wherein the at least one power generator is two or more power generators, wherein the energy management module controls one or more of a corresponding two or more power outputs of the two or more power generators, wherein the total power output is the total power output of the two or more generators.

Embodiment 20. The method according to embodiment 18, wherein the at least one power generator is two or more power generators, wherein the energy management module controls one or more of a corresponding two or more power outputs of the two or more power generators, wherein the total power output is the total power output of the two or more generators.

Embodiment 21. The method according to embodiment 14, wherein the power generation level for the $(n+1)^{th}$ control period is a greater of a mean value of the total power usage during the $n^{th}$ control period and the total power usage at a point in time during the $n^{th}$ control period.

Embodiment 22. The method according to embodiment 21, wherein the point in time during the $n^{th}$ control period is an end of the $n^{th}$ control period.

Embodiment 23. The method according to embodiment 21, further comprising monitoring the total power usage during the $n^{th}$ control period.

Embodiment 24. The method according to embodiment 23, further comprising calculating the mean value of the total power usage during the $n^{th}$ control period.

Embodiment 25. The method according to embodiment 1, wherein the at least one power generator comprises one or more of the following: a wind turbine, a solar panel, a gas turbine, a fuel cell, a micro-turbine, a reciprocating engine, and a steam engine.

Embodiment 26. The method according to embodiment 1, further comprising at least one feeder configured to provide the total output power to the at least one load, wherein each of the at least one power generator is connected to a feeder of the at least one feeder.

Embodiment 27. The method according to embodiment 1, wherein the at least one load comprises nodes of a plurality of computing infrastructures.

Embodiment 28. The method according to embodiment 27, wherein the nodes include one or more of the following: a server, a microprocessor, and an electronic device.

Embodiment 29. The method according to embodiment 26, wherein each of the at least one power generator is connected to the feeder via a corresponding at least one circuit breaker and/or power electronic interface.

Embodiment 30. The method according to embodiment 29, wherein the at least one feeder is connected to the at least one load via a second corresponding at least one circuit breaker and/or power electronic interface.

Embodiment 31. The method according to embodiment 29, wherein the at least one circuit breaker and/or power electronic interface is coordinated by the energy management module.

Embodiment 32. The method according to embodiment 1, wherein the power generation level for the $n^{th}$ control period is based on at least a total power usage for the $(n-1)^{th}$ control period.

Embodiment 33. The method according to embodiment 31, wherein the at least one feeder is interconnected to a utility main grid.

Embodiment 34. The method according to embodiment 33, wherein the at least one feeder is interconnected to the utility main grid via a point of common coupling.

Embodiment 35. The method according to embodiment 1, wherein the at least one load comprises at least one critical load.

Embodiment 36. The method according to embodiment 1, wherein the at least one load comprises at least one non-critical load.

Embodiment 37. The method according to embodiment 35, wherein the at least one power generator comprises one or more gas turbine and/or fuel cell, wherein the one or more gas turbine and/or fuel cell is allocated for the at least one critical load.

Embodiment 38. The method according to embodiment 35, wherein the at least one feeder is connected to the at least one load via a second corresponding at least one circuit breaker and/or power electronic interface, wherein each critical load of the at least one critical load is connected to a power distribution unit, wherein the power distribution unit is between one of the second at least one circuit breaker and/or power electronic interface and the each critical load.

Embodiment 39. The method according to embodiment 35, wherein the at least one critical load is a data center load.

Embodiment 40. The method according to embodiment 39, wherein the data center load comprises a plurality of server clusters, wherein the power demand controller manages the plurality server clusters by
 i. tracking a job running status of each server cluster of the plurality server clusters;
 ii. tracking a power demand of each server cluster of the plurality of server clusters; and
 iii. coordinating with job schedulers to optimize computing resource allocation.

Embodiment 41. The method according to embodiment 2, wherein the power demand controller signals the energy management module the power generation level for the $n^{th}$ control period by providing the energy management module with a power generation adjustment for the $n^{th}$ control period, wherein the energy management module controls the one or more of the at least one generator to adjust the total power output during the $n^{th}$ control period such that the power generation level for the $n^{th}$ control period is the power generation level for the $(n-1)^{th}$ control period adjusted by the power generation adjustment for the $n^{th}$ control period.

Embodiment 42. The method according to embodiment 36, wherein one or more of the at least one non-critical load is one or more data processing machines.

Embodiment 43. The method according to embodiment 36, wherein the at least one power generator comprises one or more wind turbine and/or solar panel, wherein the one or more wind turbine and/or solar panel are allocated to power the at least one non-critical load.

Embodiment 44. The method according to embodiment 1, wherein the at least one feeder is connected to the at least one load via a second corresponding at least one circuit breaker and/or power electronic interface.

Embodiment 45. The method according to embodiment 44, further comprising:
providing one or more energy storage elements are configured to provide power to at least one of the at least one load, such that the total power usage can be higher than the total power output.

Embodiment 46. The method according to embodiment 11, wherein the one or more energy storage elements comprise a UPS system.

Embodiment 47. The method according to embodiment 11, wherein the one or more energy storage elements provide stored energy during a startup time during which a power output of one of the at least one power generator ramps up when total power usage is higher than total power output.

Embodiment 48. The method according to embodiment 41, wherein during the startup time, the power output of one of the at least one power generator ramps up to contribute to the power generation level of the $n^{th}$ control period being adjusted up from the power generation level of the $(n-1)^{th}$ control period; during which the total power output is lower than the power generation level of the $n^{th}$ control period.

Embodiment 49. The method according to embodiment 47, wherein the UPS system comprises a centralized UPS system.

Embodiment 50. The method according to embodiment 47, wherein the UPS system comprises a distributed UPS system.

Embodiment 51. The method according to embodiment 3, wherein the power demand controller signals the energy management module the power generation level for the $(n+1)^{th}$ control period by providing a power generation adjustment for the $(n+1)^{th}$ control period, wherein the power generation level for the $(n+1)^{th}$ control period is the power generation level for the $n^{th}$ control period adjusted by the power generation adjustment for the $(n+1)^{th}$ control period.

Embodiment 52. The method according to embodiment 2, wherein the total power usage over two or more control periods is a square-wave-like curve.

Embodiment 53. The method according to embodiment 52, wherein the square-wave-like curve differs from an ideal square wave due to a transition from the power generation level for the $n^{th}$ control period to the power generation level for the $(n+1)^{th}$ control period not being instantaneous, as changing an output power for one of the at least one power generator takes time to ramp up to a higher value or ramp down to a lower value.

Embodiment 54. The method according to embodiment 2, wherein the total power usage over two or more control periods is a curve selected from the following: a sine curve, a sine-like curve, a triangle curve, a triangle-like curve, a saw tooth curve, and a saw tooth-like curve.

Embodiment 55. The method according to embodiment 2, wherein each control period has a time duration in the range of 5 minutes to 20 minutes.

Embodiment 56. The method according to embodiment 2, wherein each control period has a time duration selected from the group consisting of the following: in the range of 5 minutes to 10 minutes, in the range of 10 minutes to 15 minutes, in the range of 15 minutes to 20 minutes, in the range of 5 minutes to 15 minutes, and in the range of 10 minutes to 20 minutes.

Embodiment 57. The method according to embodiment 7, wherein when the total power usage of the at least one load during the $n^{th}$ control period exceeds the power generation level for the $n^{th}$ control period, the power demand controller adjusts one or more of the at least one load during the $n^{th}$ control period so as to maintain the total power usage equal to or less than the power generation level for the $n^{th}$ control period.

Embodiment 58. The method according to embodiment 57, wherein when the total power usage of the at least one load during the $n^{th}$ control period does not exceed the power generation level for the $n^{th}$ control period, the power demand controller does not adjust the one or more of the at least one load during the $n^{th}$ control period.

Embodiment 59. The method according to embodiment 10, wherein the at least one load comprises at least one node, wherein when the total power usage during the $n^{th}$ control period exceeds the power generator level for the $n^{th}$ control period, the power demand controller adjusts the one or more of the at least one load so as to maintain the total power usage to be equal to or less than the power generator level for the $n^{th}$ control period by tuning a node performance level of one or more of the at least one node.

Embodiment 60. The method according to embodiment 59, wherein tuning the node performance level of one or more of the at least one node is accomplished by adjusting a node frequency of the one or more of the at least one node.

Embodiment 61. The method according to embodiment 60, wherein adjusting a node frequency of the one or more of the at least one node comprises adjusting the node frequency of the one or more of the at least one node in a round-robin manner.

Embodiment 62. The method according to embodiment 60, wherein adjusting a node frequency of the one or more of the at least one node comprises adjusting the node frequency of the one or more of the at least one node based on priorities of users of the at least one loads.

Embodiment 63. The method according to embodiment 59, wherein the at least one load comprises a plurality of nodes.

Embodiment 64. The method according to embodiment 62, wherein the at least one node comprises a plurality of nodes, wherein each node is associated with a priority of at least two priorities, wherein adjustment of a frequency for each node is based on the priority of the node.

Embodiment 65. The method according to embodiment 64, wherein a group of nodes with higher priority are adjusted to run at a higher frequency than a second group of nodes with lower priority.

Embodiment 66. The method according to embodiment 1, wherein the power demand controller and the energy management module comprise a single processor.

Embodiment 67. The method according to embodiment 10, wherein the one or more points in time is a plurality of points in time that occurs every Tc seconds.

Embodiment 68. The method according to embodiment 11, wherein when the one or more storage elements provide power to at least one of the at least one load during the $(n-1)^{th}$ control period, the power demand controller communicates with the energy management module to provide the energy management module with a bonus power budget for the $n^{th}$ control period, wherein the energy management module controls the one or more of the at least one generator to adjust the total power output during the $n^{th}$ control period, such that the power generation level for the $n^{th}$ control period is the power generation level for the $(n-1)^{th}$ control period adjusted by the power generation level adjustment for the $n^{th}$ control period and adjusted for the bonus power budget for the $n^{th}$ control period.

Embodiment 69. The method according to embodiment 68, wherein the power level generation and adjustment for the $n^{th}$ control period better matches the total power output to the total power usage, wherein the bonus power budget for the $n^{th}$ control period causes the total power output to provide extra power output for recharging one or more energy storage elements.

Embodiment 70. The method according to embodiment 1, wherein at least one generator is within 10 miles of the at least one load.

Embodiment 71. The method according to embodiment 11, wherein Tc is a clock cycle.

Embodiment 72. The method according to embodiment 71, wherein Tc is one second.

Embodiment 73. The method according to embodiment 60, wherein the power demand controller keeps the timing statistics of each active job during runtime, wherein during the $n^{th}$ control period, wherein the at least one load comprises a computing node, wherein the computing node spends different control periods $t_i$ on different frequency $F_i^{PDS}$, wherein a normalized progress of a job at the computing node is defined as:

$$NP_j = \frac{T}{T^{PDS}} = \frac{1}{\sum t_i}\left(\sum_i \frac{\mu F_i^{PDS} + (1-\mu)F}{F} t_i\right)$$

where F is a full node frequency without adjusting, $T^{PDS}$ is a time the job spends when the node frequency is adjusted, and T is a time the job would spend if the node frequency is not adjusted.

Embodiment 74. The method according to embodiment 73, further comprising evaluating a degree of job slowdown, where system throughput (STP) is defined as a mean NP across all jobs, as:

$$STP = \frac{1}{J}\sum_{k=1}^{J} NP_k.$$

Embodiment 75. The method according to embodiment 74, wherein at an end of the $n^{th}$ control period, if STP is lower than a preset goal, the power demand controller signals the energy management module with a load bonus power budget for the $(n+1)^{th}$ control period such that the power generation level for the $(n+1)^{th}$ control period is increased by the load bonus power budget for the $(n+1)^{th}$ control period, wherein the load bonus power budget is available to provide extra power to the at least one load during the $(n+1)^{th}$ control period.

Embodiment 76. The method according to embodiment 75, wherein the power demand controller enables CPU frequency boost mode on each node.

Embodiment 77. The method according to embodiment 74, further comprising sorting short jobs using job runtime estimates, where short jobs are tasks that will finish before the $n^{th}$ control period ends.

Embodiment 78. The method according to embodiment 77, further comprising determining all the short jobs that have low normalized progress, wherein the power demand controller checks available UPS stored energy and uses bin-packing to power a group of selected short jobs.

Embodiment 79. The method according to embodiment 1, wherein the energy management module controls the one or more of the at least one power outputs by adjusting a power output of at least one of the one or more of the at least one power generators with frequency droop control.

Embodiment 80. The method according to embodiment 44, wherein frequency droop control changes a power bus frequency to adjust the power output.

Embodiment 81. A non-transitory computer readable medium containing a set of instructions that when executed cause a computer to perform a method for managing a power generation system and at least one load, comprising:

controlling one or more of at least one power usage used by a corresponding at least one load during a control period, wherein the one or more of the at least one power usage are controlled such that a total power usage used by the at least one load during the control period is less than or equal to a power generation level for the control period;

controlling one or more of at least one power output of a corresponding at least one power generator during the control period, wherein the one or more of the at least one power output are controlled such that a total power output of the at least one power generator during the $n^{th}$ control period is at least the power generation level for the $n^{th}$ control period.

Embodiment 82. A system for managing a power generation system and at least one load, comprising:

a power demand controller; and
an energy management module, wherein the power demand controller is configured to control one or more of at least one power usage used by a corresponding at least one load during a control period, wherein the power demand controller is configured to control the one or more of the at least one power usage such that a total power usage used by the at least one load during the control period is less than or equal to a power generation level for the control period;

wherein the energy management module is configured to control one or more of at least one power output of a corresponding at least one power generator during the control period, wherein the energy management module is configured to control the one or more of the at least one power output such that a total power output of the at least one power generator during the $n^{th}$ control period is at least the power generation level for the $n^{th}$ control period.

Embodiment 83. The method according to embodiment 2, wherein the $n^{th}$ control period includes a ramp up period during which the power generation level for the $n^{th}$ control period is higher than the power generation level for the $(n+1)^{th}$ control period, wherein the ramp up period is a period the one or more of at least one power generator are ramping up the total power output until the total power output reaches the power generation level for the $n^{th}$ control period.

Embodiment 84. The method according to embodiment 83, wherein during the ramp up period the total power output is below the power generation level for the $n^{th}$ control period.

Embodiment 85. The method according to embodiment 84, further comprising:

controlling the one or more of at least one load to maintain the total power usage at or below the total power output during the ramp up period.

Embodiment 86. The method according to embodiment 84, further comprising:

providing a difference between the power generation level during the $n^{th}$ control period and the total power usage to the at least one load during the ramp up period via one or more energy storage units.

Embodiment 87. The method according to embodiment 84, further comprising:

controlling the one or more of at least one load to maintain the total power usage at or below the total power output during the ramp up period; and providing at least a portion of the difference between the power generation level during the $n^{th}$ control period and the total power usage to the at least one load during the ramp up period via one or more energy storage units, such that the total power usage is below the total power output during the ramp up period.

Aspects of the invention may be described in the general context of computer-executable instructions, such as program modules, being executed by a computer. Generally, program modules include routines, programs, objects, components, data structures, etc., that perform particular jobs or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of jobs in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method for managing a power generation system and at least one load, comprising:
    providing at least one processor; and
    during each control period of a plurality of consecutive control periods,
        controlling one or more power usages of at least one power usage used by a corresponding one or more loads of a corresponding at least one load during the control period via the at least one processor, such that a total power usage used by the at least one load during the control period is less than or equal to a power generation level for the control period,
        wherein the power generation level for the control period is determined at, or before, a previous end of a previous control period, and
        wherein the control period consecutively follows the previous control period; and
        controlling one or more power outputs of at least one power output generated by a corresponding one or more power generators of a corresponding at least one power generator during the control period via the at least one processor, such that a total power output of the at least one power generator during the control period, after a ramp up period, or ramp down period, if any, is at least the power generation level for the control period,
        wherein the ramp up period, if any, is a period of time the at least one power generator takes to ramp up from a previous power generation level for the previous control period to the power generation level for the control period, and
        wherein the ramp down period, if any, is a period of time the at least one power generator takes to ramp down from the previous power generation level to the power generation level for the control period.

2. The method according to claim 1,
    wherein each control period of the plurality of consecutive control periods has a time duration of Tcp,
    wherein Tcp is in a range of 5 minutes to 20 minutes.

3. The method according to claim 1,
    wherein the at least one load is two or more loads, and
    wherein the at least one power generator is two or more power generators.

4. The method according to claim 1,
    wherein controlling the one or more power usages used by the one or more loads during the control period via the at least one processor, such that the total power usage during the control period is less than or equal to the power generation level for the control period, comprises:
        monitoring a total expected power usage of the at least one load at one or more points in time during the control period; and
        if the total expected power usage is higher than the power generation level for the control period, adjusting a corresponding one or more load performances of the one or more loads, such that the total power usage is less than or equal to the power generation level for the control period,
    wherein for each control period, further comprising:
        determining a following power generation level for a following control period,
        wherein the following control period consecutively follows the control period,
        wherein the following power generation level is based on at least the total expected power usage during the control period, and
        wherein the following power generation level is determined at, or before, an end of the control period.

5. The method according to claim 4,
    wherein the one or more points in time is a plurality of points in time that occurs every Tc seconds,
    wherein Tc is less than 10.

6. The method according to claim 4,
    wherein the at least one load comprises at least one node,
    wherein when the total expected power usage during the control period exceeds the power generator level for the control period, the one or more power usages of the one or more loads are adjusted so as to maintain the total power usage to be equal to or less than the power generator level for the control period by tuning one or more node performance levels of a corresponding one or more nodes of the at least one node, and
    wherein tuning the one or more node performance levels of the one or more nodes of the at least one node is accomplished by adjusting a corresponding one or more node frequencies of the one or more nodes of the at least one node.

7. The method according to claim 4,
    wherein the power generation level for the following control period is the greater of:
        (i) a mean value of the total expected power usage of the at least one load at the corresponding one or more points in time during the control period; and
        (ii) the total expected power usage at an end of the control period.

8. The method according to claim 7,
wherein the at least one processor comprises:
a power demand controller,
wherein the power demand controller controls the one or more power usages used by the one or more loads during a control period, such that the total power usage used by the at least one load during the control period is less than or equal to the power generation level for the control period; and
an energy management module,
wherein the energy management module controls the one or more power outputs of the one or more power generators, such that the total power output during the control period is at least the power generation level for the control period, after the ramp up period, or the ramp down period, if any,
wherein the power demand controller signals the energy management module the power generation level for the control period by providing the energy management module with a power generation adjustment for the control period, and
wherein the power generation level for the control period is the previous power generation level for the previous control period adjusted by the power generation adjustment for the control period.

9. The method according to claim 4,
wherein one or more energy storage elements are configured to provide temporary power to a second one or more loads of the at least one load during the ramp up period, if any, such that during the ramp up period, if any, the total power output of the at least one generator plus the temporary power provided by the one or more energy storage elements is at least the power generation level for the control period.

10. The method according to claim 9,
wherein the one or more energy storage elements comprise:
a centralized UPS system; or
a distributed UPS system.

11. The method according to claim 9,
wherein the one or more energy storage elements are configured to receive power from the at least one generator,
wherein the at least one processor comprises:
a power demand controller,
wherein the power demand controller controls the one or more power usages used by the one or more loads during a control period, such that the total power usage used by the at least one load during the control period is less than or equal to the power generation level for the control period; and
an energy management module,
wherein the energy management module controls the one or more power outputs of the one or more power generators, such that the total power output during the control period is at least the power generation level for the control period, after the ramp up period, or the ramp down period, if any,
wherein when the one or more storage elements do not provide temporary power to a second one or more of the at least one load during the previous control period, the power demand controller signals the energy management module the power generation level for the control period by providing the energy management module with a power generation adjustment for the control period, and the power generation level for the control period is the previous power generation level for the previous control period adjusted by the power generation adjustment for the control period,
wherein when the one or more storage elements provide temporary power to the second one or more loads during the previous control period, the power demand controller signals the energy management module the power generation level for the control period by providing the energy management module with a power generation adjustment for the control period and providing the energy management module with a charging bonus power budget for the control period, and the power generation level for the control period is the power generation level for the previous control period adjusted by the power generation level adjustment for the control period and adjusted by the charging bonus power budget for the control period, and
wherein the charging bonus power budget for the control period causes the total power output to include extra power output for recharging the one or more energy storage elements.

12. The method according to claim 1,
wherein at least one feeder provides the total output power to the at least one load,
wherein each power generator of the at least one power generator is connected to the at least one feeder, and
wherein the at least one feeder is interconnected to a utility main grid via a point of common coupling.

13. The method according to claim 1,
wherein at least one feeder provides the total output power to the at least one load,
wherein each power generator of the at least one power generator is connected to the at least one feeder,
wherein the at least one power generator comprises:
one or more gas turbines; or
one or more fuel cells,
wherein the one or more gas turbines or one or more fuel cells is allocated for at least one critical load of the at least one load,
wherein the at least one feeder is connected to the at least one critical load of the at least one load via:
(i) one or more circuit breakers;
(ii) one or more power electronic interfaces; or
(iii) one or more circuit breakers and one or more power electronic interfaces, and
wherein each critical load of the at least one critical load is connected to a power distribution unit such that the power distribution unit is:
(i) between one circuit breaker of the one or more circuit breakers and the each critical load; or
(ii) between one power electronic interface of the one or more power electronic interfaces and the each critical load.

14. The method according to claim 13,
wherein the at least one critical load comprises a data center load,
wherein the data center load comprises a plurality of server clusters.

15. The method according to claim 1,
wherein at least one feeder provides the total output power to the at least one load,
wherein each power generator of the at least one power generator is connected to the at least one feeder,
wherein the at least one power generator comprises:
(i) one or more wind turbines;
(ii) one or more solar panels; or
(iii) one or more wind turbines and one or more solar panels, wherein:
(i) the one or more wind turbines;
(ii) the one or more solar panels; or
(iii) the one or more wind turbines and one or more solar panels,
are allocated to power at least one non-critical load, and
wherein each power generator of the at least one power generator is connected to the at least one feeder via:
(i) a corresponding circuit breaker;
(ii) a corresponding power electronic interface; or
(iii) a corresponding circuit breaker and a corresponding power electronic interface.

16. The method according to claim 1, wherein the at least one power generator is within 10 miles of the at least one load.

17. The method according to claim 1, wherein the at least one load comprises a computing node, wherein the method further comprises:
keeping timing statistics of each active job at the computing node during runtime during the control period,
wherein the computing node spends different time periods $t_i$ on different frequencies $F_i^{PDS}$,
wherein a normalized progress, NP, of a job at the computing node is defined as:

$$NP_j = \frac{T}{T^{PDS}} = \frac{1}{\sum t_i}\left(\sum_i \frac{\mu F_i^{PDS} + (1-\mu)F}{F} t_i\right)$$

where F is a full node frequency without adjusting, $T^{PDS}$ is a time the job spends when the node frequency is adjusted, $\mu$ is a mean CPU utilization, and T is a time the job would spend if the node frequency is not adjusted; and
either:
(a) evaluating a degree of job slowdown,
where system throughput (STP) is defined as a mean NP across all jobs,
wherein there are J jobs, as:

$$STP = \frac{1}{J}\sum_{k=1}^{J} NP_k$$

(b) if STP was lower than a preset goal at an end of a previous control period, increasing the power generation level for the control period by a load bonus power budget; and
(c) enabling CPU frequency boost mode on the computing node,
wherein increasing the power generation level for the control period by the load bonus power budget causes the total power output to include extra power output for powering the CPU frequency boost mode enabled on the computing node; or
(a) sorting out short jobs at the computing node using job runtime estimates;
(b) determining all the short jobs that have low normalized progress;
wherein short jobs are tasks that will finish before the control period ends;
(c) checking available UPS stored energy; and
(d) using bin-packing to power a group of selected short jobs.

18. The method according to claim 1, wherein controlling the one or more power outputs of the one or more power generators comprises adjusting at least one power output of the one or more power outputs of the one or more power generators with frequency droop control.

19. A non-transitory computer readable medium containing a set of instructions that when executed cause a computer to perform a method for managing a power generation system and at least one load, comprising:
controlling one or more power usages of at least one power usage used by a corresponding one or more loads of the at least one load during each control period of a plurality of consecutive control periods, such that a total power usage used by the at least one load during the control period is less than or equal to a power generation level for the control period,
wherein the power generation level for the control period is determined at, or before, a previous end of a previous control period, and
wherein the control period consecutively follows the previous control period;
controlling one or more power outputs of at least one power output of a corresponding one or more power generators of the at least one power generator during the control period, such that a total power output of the at least one power generator during the control period is at least the power generation level for the control period, after a ramp up period, or ramp down period, if any,
wherein the ramp up period, if any, is a period of time the one or more power generators of the at least one power generator take to ramp up from a previous power generation level for the previous control period to the power generation level for the control period, and
wherein the ramp down period, if any, is a period of time the one or more power generators of the at least one power generator take to ramp down from the previous power generation level of the previous control period to the power generation level for the control period.

20. A system for managing a power generation system and at least one load, comprising:
at least one processor,
wherein the at least one processor is configured to control one or more power usages of at least one power usage used by a corresponding one or more loads of at least one load during a control period, such that a total power usage used by the at least one load during the control period is less than or equal to a power generation level for the control period,
wherein the power generation level for the control period is determined at, or before, a previous end of a previous control period,
wherein the control period consecutively follows the previous control period;
wherein the at least one processor is configured to control one or more power outputs of at least one power output of a corresponding one or more power generators at least one power generator during the control period, such that a total power output of the at least one power generator during the control period is at least the power generation level for the control period, after a ramp up period, or ramp down period, if any,
wherein the ramp up period, if any, is a period of time the one or more power generators of the at least one power generator take to ramp up from a previous power generation level for the previous control period to the power generation level for the control period, and wherein the ramp down period, if any, is a period of time the one or more power generators of the at least one power generator take to ramp down from the previous power generation level of the previous control period to the power generation level for the control period.

* * * * *